H. F. STARRETT.
PANEL BOARD AND PANEL BOARD CONSTRUCTION.
APPLICATION FILED MAY 11, 1917.
1,294,185.
Patented Feb. 11, 1919.
9 SHEETS—SHEET 1.
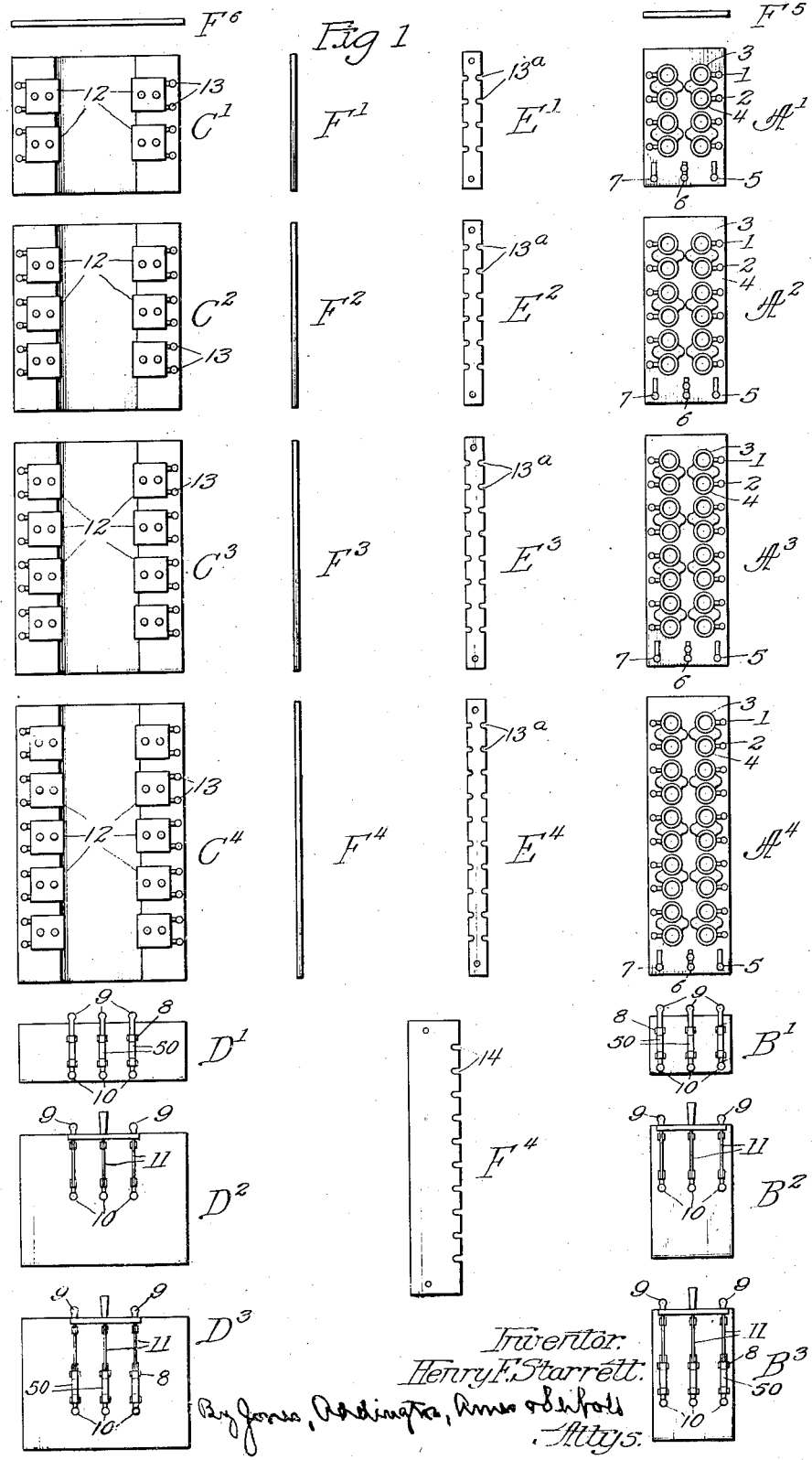

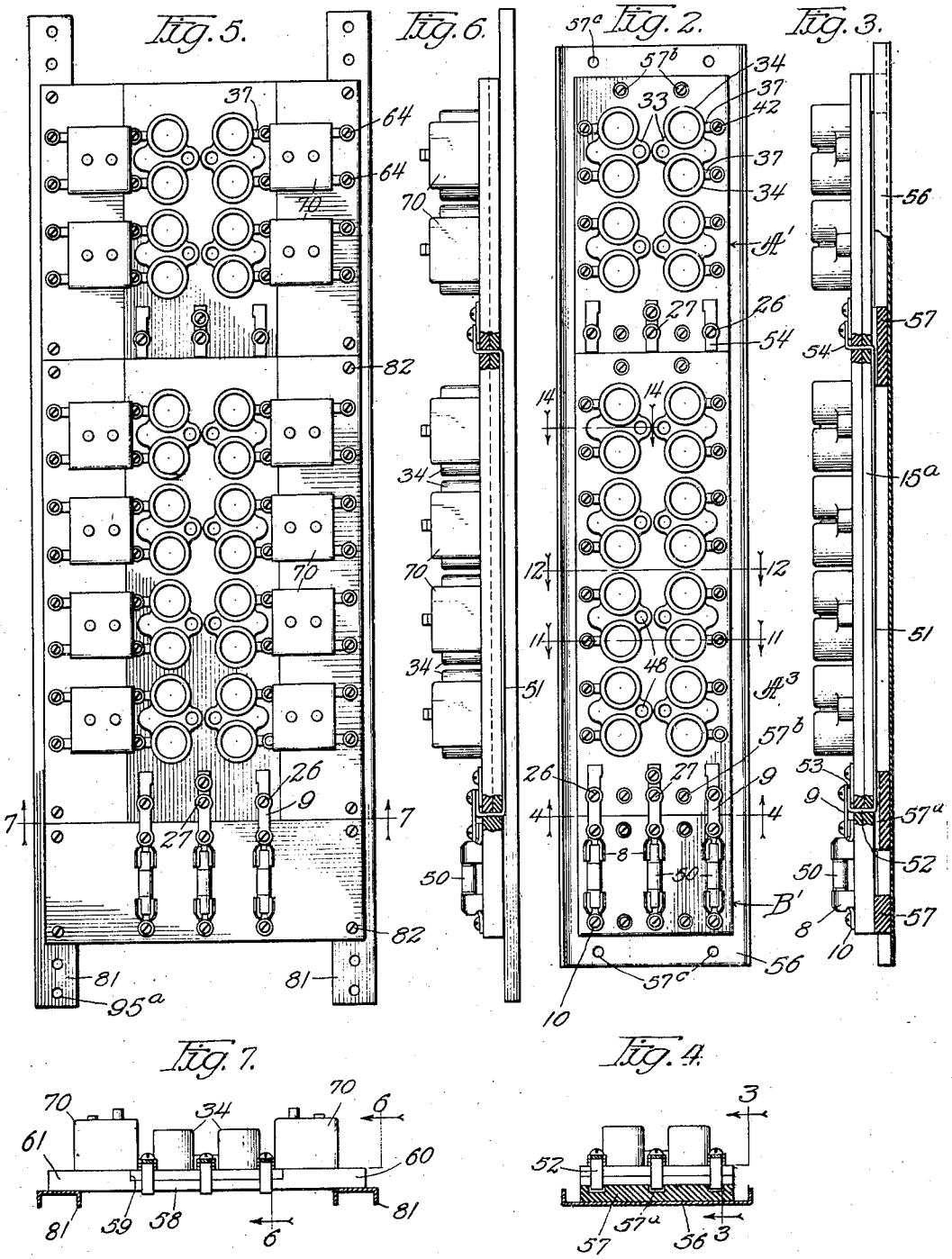

H. F. STARRETT.
PANEL BOARD AND PANEL BOARD CONSTRUCTION.
APPLICATION FILED MAY 11, 1917.

1,294,185.

Patented Feb. 11, 1919.
9 SHEETS—SHEET 3.

Inventor:
Henry F. Starrett

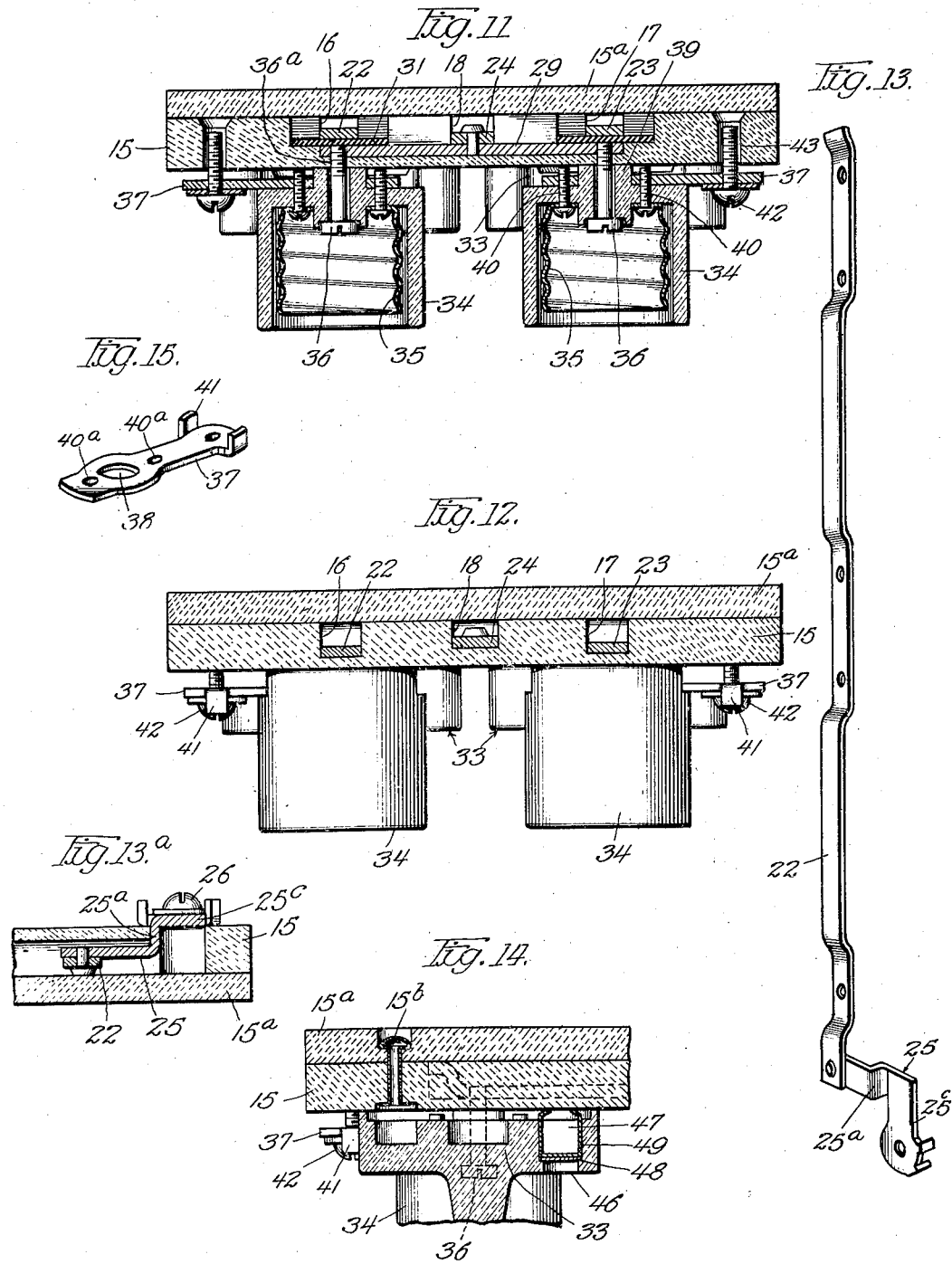

H. F. STARRETT.
PANEL BOARD AND PANEL BOARD CONSTRUCTION.
APPLICATION FILED MAY 11, 1917.
1,294,185.
Patented Feb. 11, 1919.
9 SHEETS—SHEET 5.
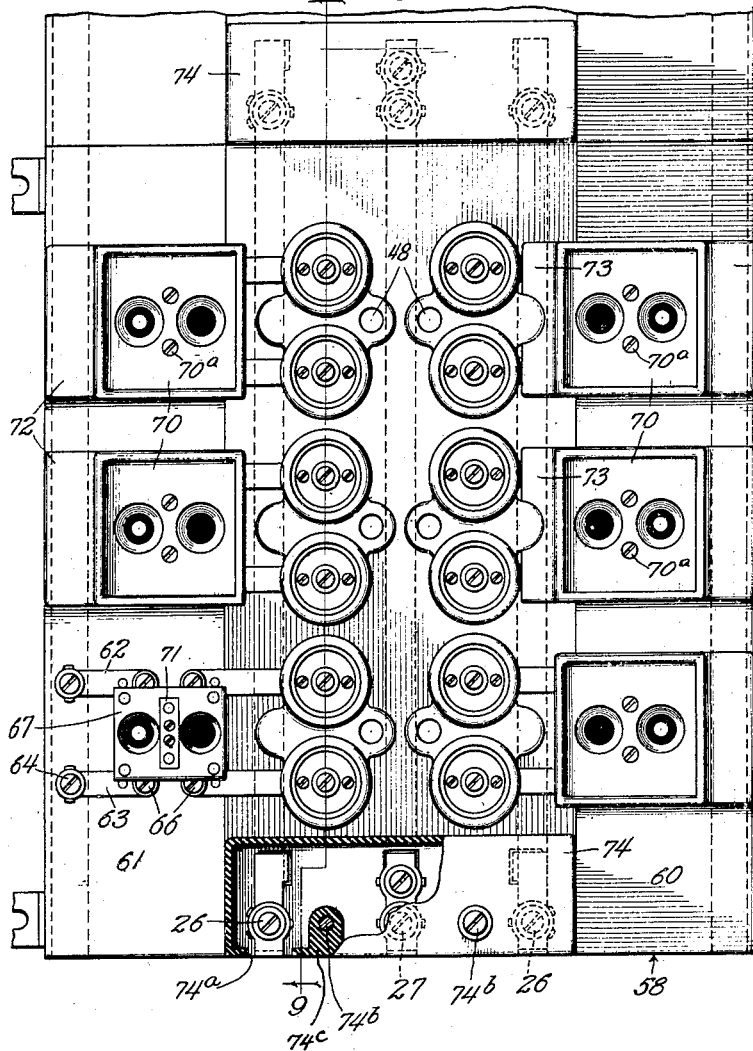
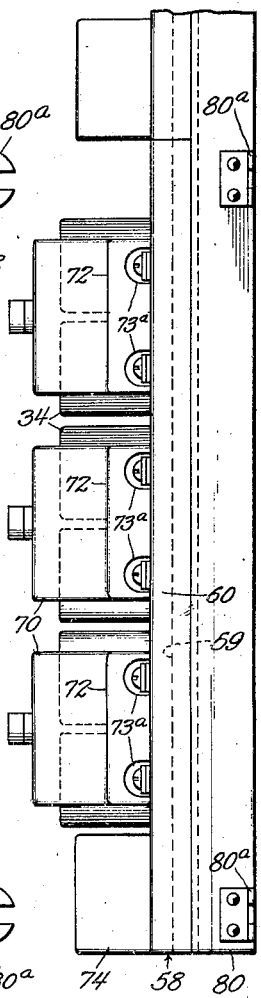
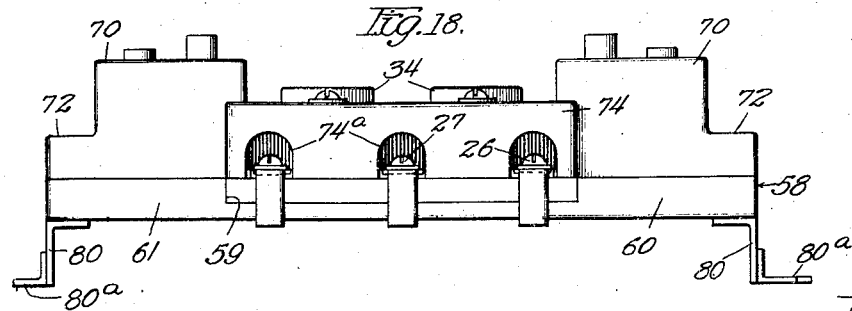
Inventor:
Henry F. Starrett.

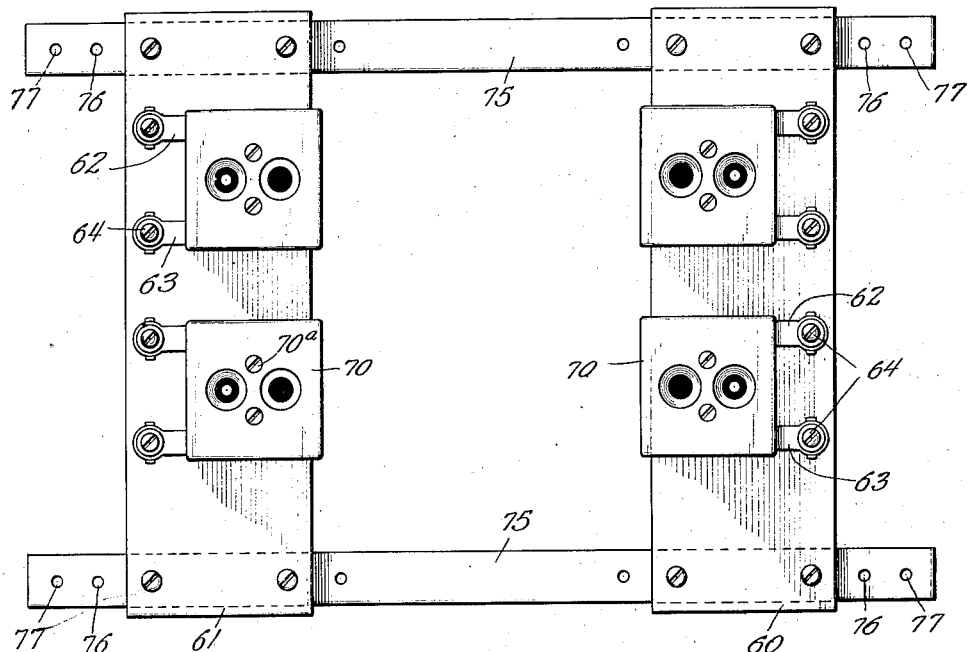
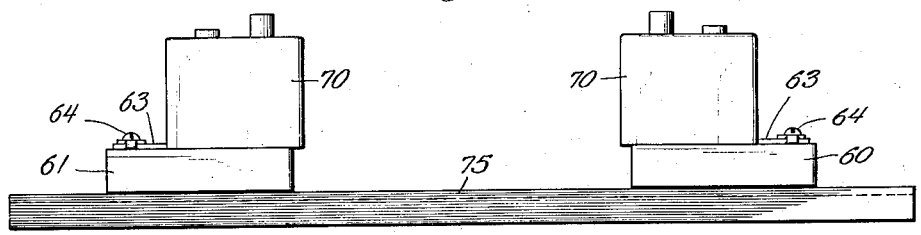
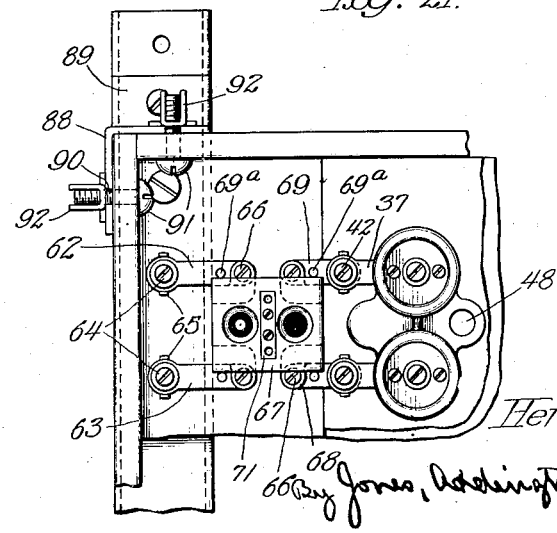

H. F. STARRETT.
PANEL BOARD AND PANEL BOARD CONSTRUCTION.
APPLICATION FILED MAY 11, 1917.
1,294,185.
Patented Feb. 11, 1919.
9 SHEETS—SHEET 7.
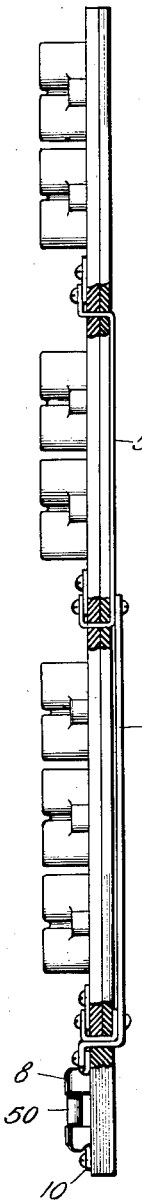
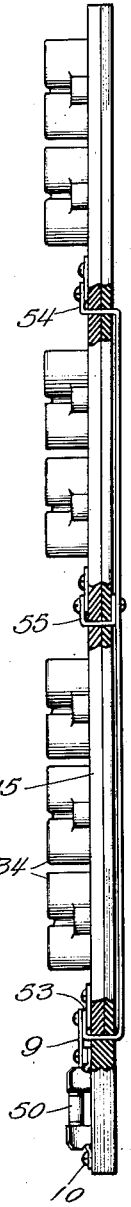
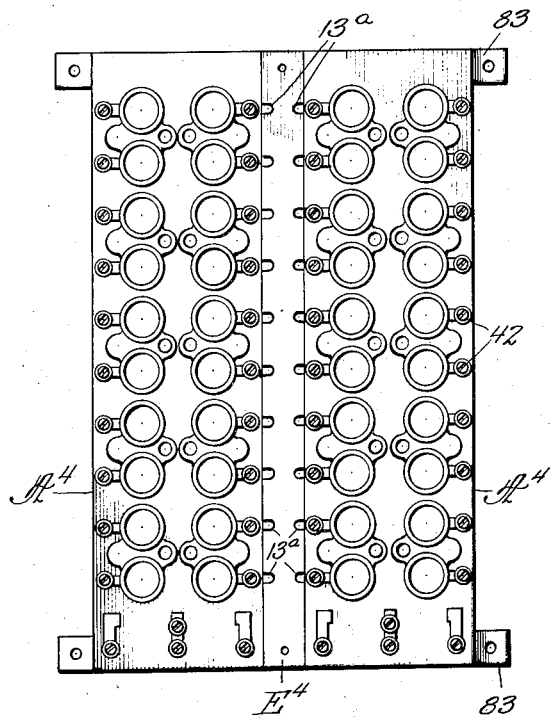
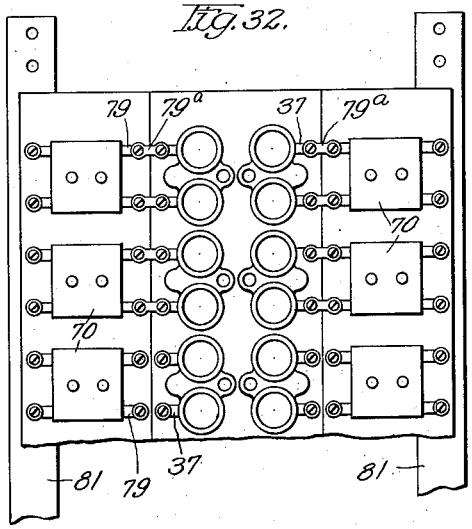
Inventor:
Henry F. Starrett.

H. F. STARRETT.
PANEL BOARD AND PANEL BOARD CONSTRUCTION.
APPLICATION FILED MAY 11, 1917.

1,294,185.

Patented Feb. 11, 1919.
9 SHEETS—SHEET 8.

Inventor:
Henry F. Starrett.
By Jones, Addington, Ames & Seibold
Attys.

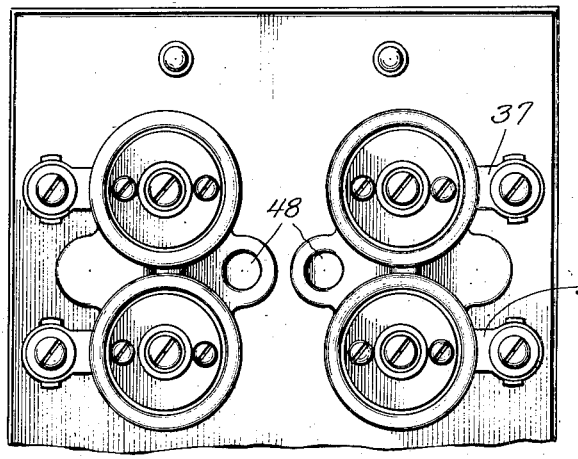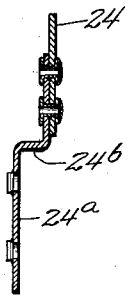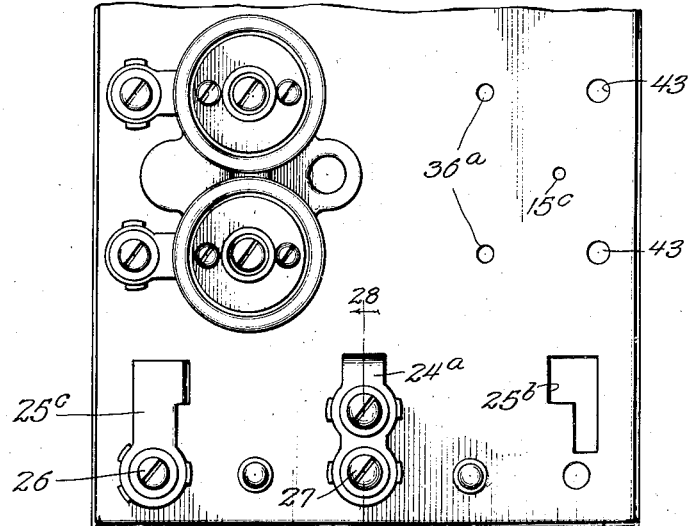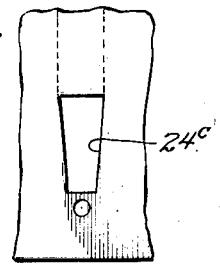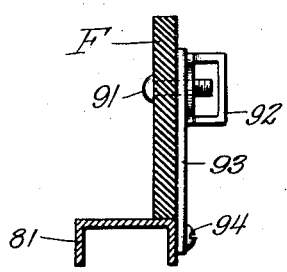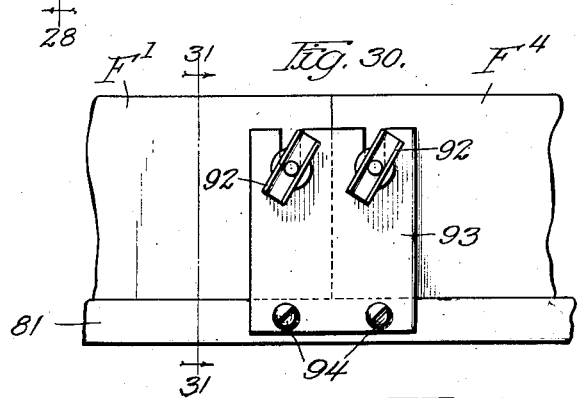

UNITED STATES PATENT OFFICE.

HENRY F. STARRETT, OF CHICAGO, ILLINOIS, ASSIGNOR TO STARRETT MANUFACTURING COMPANY, OF CHICAGO, ILLINOIS, A CORPORATION OF ILLINOIS.

PANEL-BOARD AND PANEL-BOARD CONSTRUCTION.

1,294,185.     Specification of Letters Patent.     Patented Feb. 11, 1919.

Application filed May 11, 1917. Serial No. 168,019.

*To all whom it may concern:*

Be it known that I, HENRY F. STARRETT, a citizen of the United States, residing at Chicago, in the county of Cook and State of Illinois, have invented new and useful Improvements in Panel-Boards and Panel-Board Construction, of which the following is a full, clear, concise, and exact description, reference being had to the accompanying drawing, forming a part of this specification.

My invention relates to panel-boards and panel-board construction, and particularly to panel-boards used in electric lighting systems and in systems of house and building wiring.

Heretofore in the commercial house and building wiring art there have been two types of what may be generally designated as distributing centers used.

One type consists of what are known as cut-out blocks. These cut-out blocks comprise porcelain blocks, having mounted thereon never more than two sets of branch wire connections. Usually these cut-outs consist merely of porcelain blocks, having extending along the surface thereof coinciding longitudinal grooves, and having arranged at opposite sides of these grooves pairs of fuse receptacles together with pairs of branch wire terminal connectors. The main, or feed wires, are led to and connected with conducting wires which are laid along the grooves. At certain points the conducting wires are stripped of their insulating covering to bare the wires, and connections are made between such bared portions of the wires and the fuse receptacles.

The installing of the cut-out block type of distributing center when properly done is really an engineering problem, but ordinarily it is done by incompetent workmen at the house or building, and as a result the electrical connections are poorly made or the conducting wires incompletely bared at the points where connection is to be made with the fuse receptacles, so that good electrical contact is not secured, and on the whole this type of distributing center is looked upon as more or less of a makeshift and is only employed when low cost is the chief desideratum. Moreover, the conducting wires on the cut-out blocks, which conduct current from the main feed wires to the fuse receptacles, are exposed at the front of the blocks, and the unsightly appearance due to this is increased by reason of the removal, in a more or less haphazard way, of the insulation at certain points along the wires. Furthermore, since these fuse blocks are constructed for only two circuits each, the installing of a distributing center for more than two circuits requires the building up of the distributing center of the desired capacity at the place of installation, by installing one after another the number of cut-out blocks, which may be a dozen or more, needed for the various branch circuits to be supplied from the feed circuit.

The other type of commercial distributing center used in house and building wiring is one in which the fuse receptacles, and switches, if employed, are located on a slate base. Bus-bars are located on the face of the panel, extending lengthwise thereof, and provided with lateral extensions. In order to provide for the connection of the fuse receptacles with the bus-bars, these bars and their lateral extensions are required to cross each other at certain points. This necessitates wide air spaces at the crossing points to avoid short circuits, with the result that there is exposed at the face of the panel a net-work of bus-bars which lies out in front of the panel.

This type of device is also required to be made up on order to meet the requirements of the particular installation and is an engineering problem, all the parts being mounted on a single slate base, which must be cut to the size required for the particular number of branch circuits, and the bus-bars arranged thereon for the particular circuit layout. The demands vary so as to the capacity of distributing centers required in practice, that it is not feasible to carry in stock panel-boards of this type adapted to meet the varying requirements. These panels are therefore built on order, according to specifications based upon the particular conditions existing where the panel-board is to be installed. Thus each specially constructed panel-board presents an engineering problem.

It is one of the objects of my invention to provide a practicable and improved panel-board construction which will avoid the difficulties and objections of the distributing centers of the prior commercial art and to reduce the same to a stock basis.

In carrying out the invention I provide a series of portable stock units from which panel-boards of any desired capacity, either with fuse receptacles alone for the branch circuits or combined with switches, may be assembled by the manufacturer, contractor or jobber, and shipped as a complete panel-board ready for installation without the assembly of the parts at the place of installation, leaving nothing to be done other than to secure the panel in position and connect the circuits to the panel.

The manufacturer can make in quantities, with consequent lessened cost, the component parts of the panel-board and carry them in stock to enable quick assembly at minimum cost. The contractor can procure from the manufacturer or jobber and carry in stock the component parts so that he can complete a job with the minimum of labor and time. The jobber can carry in stock the several component parts and thus be in position to fill orders from stock for any size of panel-board desired by a customer. The manufacturer, contractor, or jobber may carry in stock portable standardized panel units of varying capacity, which can readily be united to construct panel-boards of a capacity larger than any of the standardized portable units. However, since these portable units are constructed for interchangeability, and the assembly thereof is an exceedingly simple operation, a large panel-board can be maintained, if desired, in a portable, disassembled state until it has been transported to the place where it is to be installed. The panel-board problem is thus reduced to a manufacturing and commercial proposition and removed almost entirely from the domain of engineering.

Briefly, the units consist of a series of portable, or individual basic units provided with fuse receptacles for branch circuits, which basic units may be of varying capacities, such as four-circuit, six-circuit, eight-circuit and ten-circuit, and may be used alone or combined with other basic units to produce a panel-board of the desired capacity; tail units of various forms designed to be used with the basic units; so-called wing units provided with switches for the branch circuits and adapted to be combined with the basic units when it is desired to have switches in the branch circuits; and certain other unit elements which may be combined with the other units, as hereafter explained, to provide a complete panel-board of the desired capacity.

It is an important feature of my invention that each basic unit is provided with a unit bus-bar system, that is, bus-bars which are of a capacity suited to the particular capacity of such unit, so that the bus-bars of such unit have to carry the current of the particular unit only and do not have to carry the current of all the units if two or more such basic units are combined to produce a panel-board of greater capacity than a single unit. This not only results in a saving of copper, but also renders the capacity of each basic unit independent of any other unit with which it may be combined, thereby permitting the making of the basic units in stock sizes. Suitable omnibus-bars are provided to carry the current to the several units when a plurality of the basic units are assembled in one panel.

I have departed entirely from the conventional idea that the distributing board for house and building wiring is an engineering problem to be solved by the engineer for each installation, and have reduced the panel-board art to a practicable portable stock basis, whereby, upon the receipt of the requirements of the contractor or user, I am enabled by the assemblage of a small number of portable stock assembly units, which may be carried in stock at all times, to furnish the contractor or user with the exact type of panel-board of the desired capacity without manufacturing each board to specifications as a separate manufactured product.

Other objects and advantages of the invention will be obvious from the accompanying description setting forth in more detail such objects and advantages and the manner in which the same are realized; and also from the accompanying drawings illustrating an embodiment of the invention, as well as modifications of certain features thereof.

Referring to the drawings—

Figure 1 is a schematic view, showing the various units designed to be assembled in various combinations to provide a panel of any desired capacity;

Fig. 2 is a front elevation showing two of the basic units and a tail unit assembled;

Fig. 3 is a sectional view on the line 3—3 of Fig. 4;

Fig. 4 is a transverse section taken on the line 4—4 of Fig. 2;

Fig. 5 is a plan view of two assembled basic and wing units, combined with a tail unit;

Fig. 6 is a sectional view on the line 6—6 of Fig. 7;

Fig. 7 is a sectional view taken on the line 7—7 of Fig. 5;

Fig. 11 is a transverse sectional view, substantially full size, of one of the basic units, taken on the line 11—11 of Fig. 2;

Fig. 12 is a similar transverse sectional view taken on the line 12—12 of Fig. 2;

Fig. 13 is a detail perspective view of one of the basic unit bus-bars;

Figure 8:
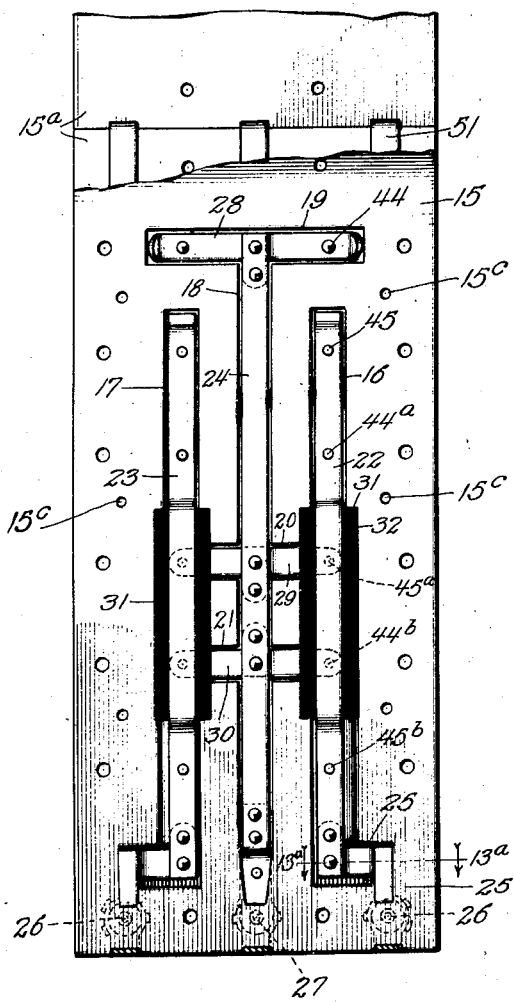
Fig. 8 is a bottom plan view of one of the basic units with the back plate broken away to disclose the unit bus-bar arrangement of the basic unit, a portion of a second unit being shown at the top of the view.
Figure 9:
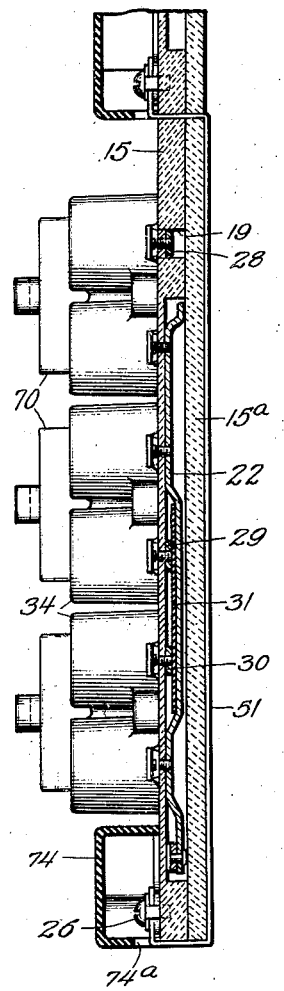
Fig. 9 is a longitudinal sectional view taken on a line corresponding to line 9—9 of Fig. 16.
Figure 24:
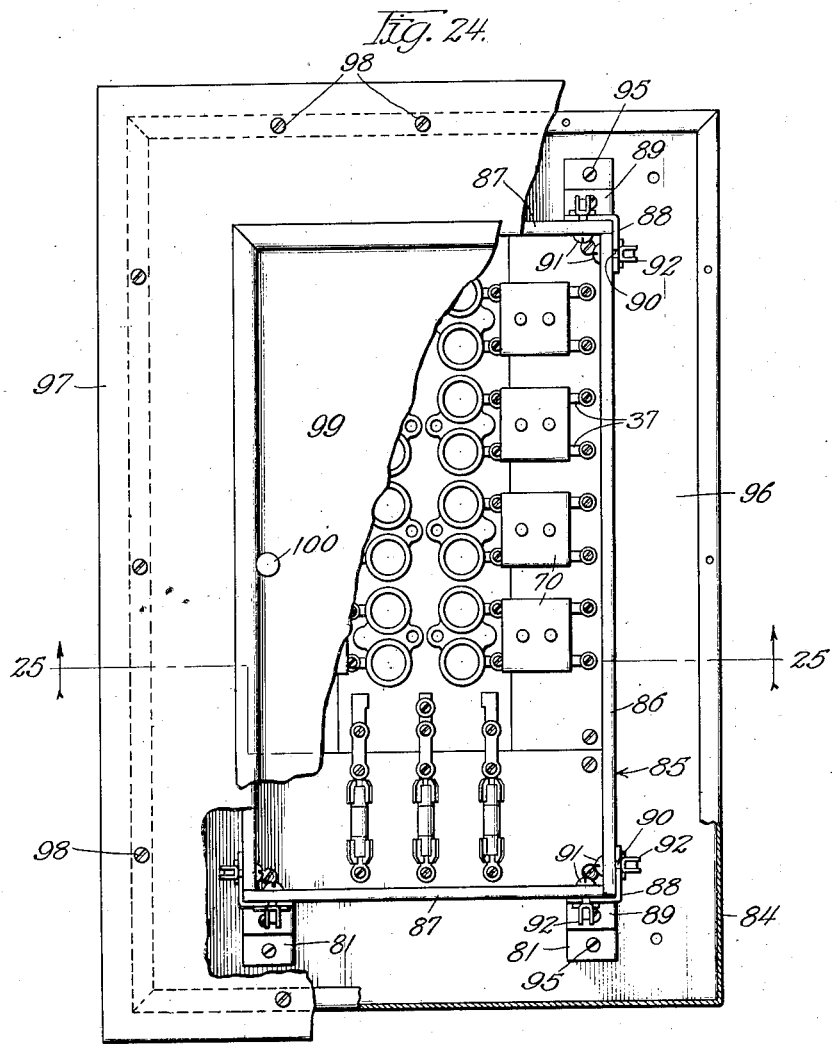
Figure 25:
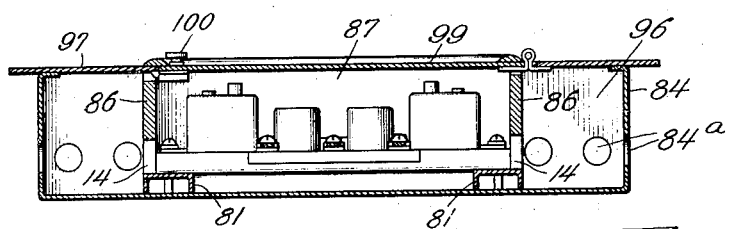

Fig. 13$^a$ is a detailed sectional view showing the manner of bringing the terminals of the side bus-bars to the front of the board, the section being taken on the line 13$^a$—13$^a$ of Fig. 8;

Fig. 14 is a detailed sectional view on the line 14—14 of Fig. 2 of a portion of one of the fuse receptacle units;

Fig. 15 is a perspective view of one of the branch wire terminal connectors;

Fig. 16 is a front elevation of a panel-board comprising assembled basic and wing units;

Fig. 17 is a side elevation thereof;

Fig. 18 is an end elevation thereof;

Fig. 19 is a front elevation showing a modified form of one of the wing units;

Fig. 20 is an end elevation thereof;

Fig. 21 is a detailed view showing one corner of a panel-board and the means for surrounding the same with an inclosing insulating barrier formed of assembled barrier units—in this view the cover of the switch is removed;

Fig. 22 is a view similar to Fig. 6 illustrating an arrangement of the omnibus-bars where more than two of the basic units are combined;

Fig. 23 is a similar view showing another arrangement of the omnibus-bars;

Fig. 24 is a plan view of a panel-board consisting of a basic unit and tail unit combined, together with a supporting frame, and housed within a containing cabinet, a part of the top and hinged door being broken away;

Fig. 25 is a section on the line 25—25 of Fig. 24;

Fig. 26 is a front elevation showing two basic units arranged side by side, illustrating the use of the spacer units;

Fig. 27 is a front elevation of a basic unit with one of the side bus-bars removed, one of the fuse receptacles also being detached;

Fig. 28 is a detail sectional view on the line 28—28 of Fig. 27, showing the terminal end of the center bus-bar;

Fig. 29 is a fragmentary view showing the opening in the front of the base of a unit through which the terminal end of the center bus-bar extends;

Fig. 30 is a fragmentary view illustrating a supporting means for the barrier;

Fig. 31 is a section on the line 31—31 of Fig. 30; and

Fig. 32 illustrates a modification.

According to my invention, I provide a plurality of assembly units which may be manufactured in stock forms and which may be used for the purpose of supplying any type or capacity of panel-board desired.

In Fig. 1, I have shown schematically various stock assembly units which are adapted to be assembled in various combinations, for the purpose of illustrating an embodiment of the invention.

As shown in Fig. 1, I provide a plurality of basic units, $A^1$, $A^2$, $A^3$, $A^4$. The basic unit $A^1$ in the embodiment illustrated is constructed to have a capacity for four branch circuits with a fuse in each branch circuit and end terminals by which the supply wires are connected to the unit. For connecting the branch circuit wires, each basic unit is provided as shown with branch circuit connectors 1 and 2, and these branch circuit connectors are extended to fuse receptacle units having fuse sockets 3 and 4. As shown, there are four of these fuse receptacle units on the basic unit $A^1$, thereby giving the unit a capacity for four branch circuits. The unit is illustrated as of the three-wire type, selected merely for purpose of illustration, and is therefore provided with three terminals, 5, 6 and 7, for connecting the unit in circuit.

For purposes of illustration, the basic unit $A^2$ is constructed of a capacity for six branch circuits, the basic unit $A^3$ for eight branch circuits, and the basic unit $A^4$ for ten branch circuits. Each of the basic units $A^2$, $A^3$ and $A^4$ is, of course, provided with branch circuit and end terminals, similar to the terminals of the basic unit $A^1$. As will be hereinafter more fully explained in detail, each of these four basic units may be used by itself to form a complete panel-board. That is, where a panel-board of a capacity for four branch circuits is desired, $A^1$ would be used, or any one of the others could be used individually so long as the number of branch circuits does not exceed the capacity of such unit. Each of these basic units forms what is known as a panel-board with fuse cut-outs in the branch circuits.

I have illustrated fuse receptacles adapted to receive the usual fuse plugs, but my invention is applicable to any other type of fuse, if desired.

If it is desired to construct a panel-board having a greater number of branch circuits than the individual basic unit of greatest capacity at hand can supply, then by suitable stock connectors two or more basic units may be combined. Thus, for instance, if it were desired to have a panel-board having twelve branch circuits, $A^3$ and $A^1$ could be combined. If it were desired to have a panel-board having sixteen branch circuits, $A^4$ and $A^2$ could be combined. If it were desired to have a panel-board having eighteen branch circuits, $A^4$ and $A^3$ could be combined, and such combinations could be repeated almost indefinitely, although I have found that in commercial practice electrical engineers prefer to split up their distributing centers and confine the capacity of their boards usually to not more than about thirty branch circuits. It is preferable to arrange the basic units with circuits arranged in multiples of two, with four as a minimum.

Each of the basic units above described is provided with exposed end terminals 5, 6 and 7, to which the feed wires are adapted to be connected. The requirements of the trade, however, are such that it is sometimes necessary to provide connecting terminals of different types. It is sometimes required, for instance, to use a connecting terminal wherein fuses are interposed between the feed wires and the panel board. Likewise, it is sometimes desired to provide a main switch between the feed wires and the panel board. Also requirements sometimes call for a main switch and fuses between the main feed wires and the panel board. In order to provide for this, I employ for use in connection with any of the basic units $A^1$, $A^2$, $A^3$, $A^4$, or combinations thereof, tail units having different forms of main line connectors, such, for example, as the tail units $B^1$, $B^2$ and $B^3$.

The tail unit $B^1$ is provided with fuse clips 8 for the reception of main line fuses. These fuse clips are also provided with connectors 9, which are adapted to be connected with the end terminals 5, 6 and 7 of any one of the basic units, thereby providing a panel-board with fuses interposed between the feed wires and the basic unit or units. This tail unit $B^1$ is also provided with terminals 10 by which the main feed wires are connected to the tail piece. The terminals 10 may have binding-posts, as illustrated, or the usual lugs, or other form of terminal may be employed. It is thus seen that by combining $B^1$ with either $A^1$, $A^2$, $A^3$ or $A^4$, a panel-board having a fused main terminal connection is provided. It is also seen that $B^1$ may be also combined with any combination of $A^1$, $A^2$, $A^3$ and $A^4$ to provide a panel-board of the capacity desired.

The tail piece $B^2$, instead of having fuse clips, is provided with a main line switch 11. This tail piece $B^2$, like the tail piece $B^1$, is provided with the connectors 9, by which the tail piece may be electrically and mechanically connected with any of the basic units $A^1$, $A^2$, $A^3$ or $A^4$, and when so connected with any one of said basic units, or with any combination of said basic units, provides a panel-board of the desired capacity having a switch in the main line.

The tail piece $B^3$ is provided not only with a switch 11, but also with fuse clips 8 and with the connectors 9, by which this tail piece $B^3$ may be connected with any one of the basic units or any combination of said basic units to provide a panel-board having a main switch and fuses in the main line.

It is obvious that other different types of tail pieces may be used, but I have selected the three types shown in the accompanying drawings as meeting the most general requirements of the trade.

As I have pointed out, the basic units A provide only a fused panel-board. The requirements of the trade are such that there is also a demand for a panel-board having not only fuses in the branch circuits, but also switches in the branch circuits, whereby the branch circuits may be independently cut out without affecting the other branch circuits or the main line.

In order to meet such a requirement and at the same time to avoid the necessity of having to build on each order a special panel-board, I provide for coöperation with the basic units A, wing units $C^1$, $C^2$, $C^3$ and $C^4$, so-called herein because they form wings with respect to the basic units when combined with the latter. These wing units carry the branch circuit switches 12, together with the branch circuit terminal connections 13. I provide for stock purposes a plurality of these wing units, one size for each size of basic unit. These basic units and the wing units of corresponding size are combined to provide a panel-board having switches in the branch circuits, as illustrated in Figs. 5, 6, 7, 16, 17, 18, 24 and 32. Thus the wing unit $C^1$ and the basic unit $A^1$ are of the same capacity and may be combined; the wing unit $C^2$ and the basic unit $A^2$ may be combined; the wing unit $C^3$ and the basic unit $A^3$ may be combined, and likewise the wing unit $C^4$ and the basic unit $A^4$. A suitable structural manner of making this combination will be pointed out hereinafter. In order to provide for boards with switches in the branch circuits of greater capacity than ten, the capacity of the wing unit $C^4$ panel-boards formed by the combination of A and C units may be employed. Thus a unit formed by combining $C^1$ and $A^1$ may be combined with a unit formed by combining $C^4$ and $A^4$, thus producing a panel-board having switches in the branch circuits and having a capacity for fourteen branch circuits.

The above combination is pointed out merely for the purpose of illustration, and it is obvious that other combinations may be made, depending on the size of board desired.

Such panels, that is, panel-boards having switches in the branch circuits, also may require different forms of main feed wire terminals, as in the case of the basic units when used alone. To meet the requirements for panel-boards with switches in the branch circuits and with different types of main line terminals, I provide, for combination with the combined wing and basic units, tail units $D^1$, $D^2$ and $D^3$. These tail units like the tail units B are provided with fuse receptacles 8, as in $D^1$, with switches 11, as in $D^2$, and with combined switches 11 and fuses 8, as in $D^3$. Each of these tail units D, like the tail units B, is provided with connectors 9 for connection with the exposed terminals 5, 6, 7 of the contiguous basic unit, so that any one of the tail units D may be assembled with any combination of the basic and wing units C and A, to provide a panel-board of the desired capacity and having the desired feed wire terminal connections.

Likewise, any one of the tail units D may be combined with any combination of the panel-boards formed by the combination of two or more basic and wing units with switches in their branch circuits.

I am thus enabled to provide certain stock units which may be carried in stock and which may be made at the factory in large stock quantities for assemblage to provide panel boards of any desired capacity.

The basic units when used alone, or the combined basic and wing units, are generally assembled, when combined to give panel-boards of greater capacity, one above the other, the units being arranged end to end. It frequently occurs, however, that the space in which the panel-board is to be mounted is such that a long panel-board can not be used, in which instance the basic units or the combined wing and basic units are arranged side by side, and when such an arrangement is made, in order to provide for the passing out of the branch circuit wires, the units are preferably spaced apart by suitable spacer units. I therefore provide a plurality of spacer units, such as $E^1$, $E^2$, $E^3$ and $E^4$, which are adapted to be interposed between the panel-board units when they are placed side by side. If a plurality of the basic units are combined end to end and located side by side with a similar combination of such basic units, corresponding spacer units are employed. Spacer units are similarly employed for spacing the combined basic and wing unit members when placed side by side.

These spacer units are made, in standard stock sizes corresponding to the panel-board units and are provided at their side edges with notches $13^a$ through which the supply wires may be brought for connection with the branch wire terminals.

The Underwriters' requirements are frequently such that the panel-boards must be inclosed by barriers surrounding the panel boards, and in order to provide such barriers to accommodate the different sized panel-boards, I provide a plurality of barrier units. These may be made in standard sizes, and to accommodate the different sized panel board units, I have found that it is sufficient in practice to provide six sizes of barrier units, such as $F^1$, $F^2$, $F^3$, $F^4$, $F^5$ and $F^6$. The barrier units $F^1$ to $F^4$ are for side use. One is arranged on each side of the panel-board and the sizes are made to correspond to the length of the basic units. The end barrier unit $F^5$ is of a length corresponding to the width of the basic units A, while the length of the barrier unit $F^6$ corresponds to the width of the wing units C. Any unusual situations can be met by cutting off such length of the barrier units as may be desired. It will thus be seen that I have reduced the number of stock parts to make up the required barrier to the minimum and at the same time am enabled to meet practically all of the trade requirements.

These barrier units, as illustrated, are provided at their bottom edges with notches 14 to permit the branch circuit wires to pass therethrough for connection with the branch circuit terminals on the panel-board, as at the terminals 1, 2, of the basic units, or the terminals 13 of the wing units. The constructions and arrangement of this barrier will be described more fully hereinafter.

From the foregoing it will be apparent that by reason of the unit construction of parts, consisting of the unit basic members, wing members, tail members, barrier members and spacer members, there is provided what may be termed a "knockdown" form of panel-board, the units being stock parts which may be readily assembled at the factory to provide a panel-board of any desired capacity within the trade requirements.

The construction of the basic units, as $A^1$, $A^2$, $A^3$, $A^4$, is illustrated more particularly in detail in Figs. 8 and 11 to 14. An important feature of these basic units is that each unit is provided with a unit bus-bar system of the capacity of the particular unit, irrespective of the capacity of any other unit or combination of units. This will be explained more in detail hereafter.

Structurally, all the basic units illustrated are the same, differing only in capacity, so that a description of one will serve for all.

In building the basic unit, I provide a flat slab or base 15 of insulating material, preferably of some non-brittle material, such as a pitch-asbestos compound, which can be readily molded in the desired shape, or such other insulating materials as are obtainable on the market. Such a mold base possesses the advantages of being light in weight, and by reason of the material employed can be made in much smaller sizes and weight for the same capacity of board than slate or like brittle material. In the rear face of this base 15 I provide suitable grooves or channels 16, 17 and 18, in which the unit bus-bars are adapted to be laid. These grooves may be formed in the molding operation. These grooves or channels serve to hold the bus-bars against lateral displacement, while the portions between the grooves insulate and properly space the bus-bars one from another, as clearly shown in Fig. 8. Due to the fact that the branch circuit fuse receptables are mounted directly over the bus-bars, as hereinafter explained, the size of the panel may be materially reduced, that is, it results in a compact structure.

The groove 18 has branches 19, 20 and 21, in which lateral extensions of the bus-bars are arranged to fit. The bus-bars 22, 23 and 24, shown in connection with a three-wire system, for purposes of illustration, are located in these grooves and are preferably formed of copper. Due to the fact that the bus-bars are concealed, it is not necessary to polish these bus-bars, and they can therefore be more cheaply made. Each of the side bus-bars, 22 and 23, is provided with an L-shaped lateral extension 25 integral with or riveted to the bus-bar and formed between its ends with a right-angle bend, as at 25ª (Fig. 13), which passes through an L-shaped opening 25ᵇ in the base 15, so that the end 25ᶜ Fig. 27, of the extension lies on the front face of the base, where it is provided with a terminal such as the binding post 26. The center bus-bar 24, likewise, has a terminal extension 24ª between which and the main body of the bus-bar is a bent portion 24ᵇ, Fig. 28, which extends through an elongated opening 24ᶜ, Fig. 29, in the base of the unit, so that the terminal extension 24ª lies on the face of the base where it is provided with a binding-post 27.

The outer bus-bars 22 and 23 provided with their terminal extensions may be inserted in place in their respective grooves in the base by passing the terminal extension 25ᶜ of each bar endwise through the opening 25ᵇ, then moving the upper end of the bus-bar toward the back of the base and then turning the bus-bar over toward and into the groove designed to receive the same. This operation is permitted by reason of the L-shape of the opening 25ᵇ and can be readily accomplished. The center bus-bar is inserted in position by passing its terminal end endwise through the elongated opening 24ᶜ, and then twisting the bar around so that it may be moved into the groove designed to receive the same. In a two-wire system, the middle bus-bar may be omitted. The center bus-bar 24 is provided with cross-bars 28, 29 and 30. The cross-bar 28 is located adjacent the top of the base, in the groove 19, while the cross-bars 29 and 30, located in the grooves 20, 21, respectively, have their ends positioned between the bus-bars 22, 23 and the base 15. In order that the ends of the cross-bars 29 and 30 where they extend over the bus-bars 22 and 23 may be properly insulated from such bus-bars, I provide insulating strips or washers 31 which are interposed between the ends of the cross-bars 29 and 30 and the bus-bars 22 and 23. These strips fit in widened portions 32 of the grooves 16 and 17 and effectually insulate the bus-bars of opposite polarity from one another where they come in close proximity.

The bus-bars are provided with suitable screw-threaded openings for the attachment of the fuse receptacles on the face of the base, and the latter are provided with registering openings for the passage of the attaching screws, as hereafter explained.

The base 15 is preferably provided with a back plate 15ª of suitable insulating material which may conveniently be molded of the same material as the base 15. This back plate is designed to be secured to the base 15 by rivets 15ᵇ, passing through openings 15ᶜ, Fig. 27, or other suitable fastening means, and thus coöperates with the base to secure the bus-bars in position. The bus-bars 22 and 23 are provided with bowed portions and upturned ends, as shown in Fig. 13, so that when the bus-bars are in position they engage both the base plate and back plate of the basic unit and are thereby held firmly in position and prevented from yielding when the fuse receptacles are screwed thereto. The ends of the cross-bar 28 on the center bus-bar are upturned, as shown in Fig. 8, for the same purpose.

The base thus constitutes in itself a unit with concealed bus-bars and to which the electrical equipment may be attached in the manner hereafter explained without disturbing the bus-bars or doing anything more than merely attaching the electrical equipment on to the face of the base.

On the face of the base 15 I mount the fuse receptacle units. These fuse receptacle units are so organized that they may readily be attached to or detached from the base. In other words, they are independently removable.

Figure 10:
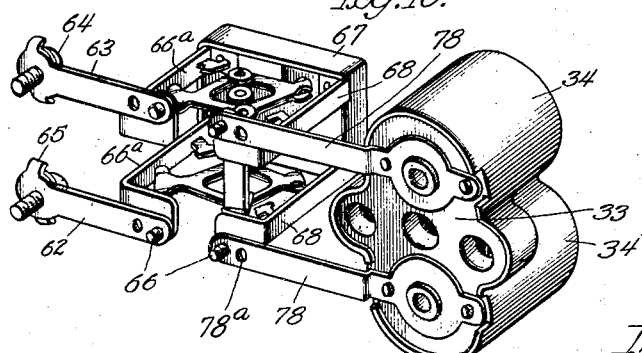
Fig. 10 is a detailed perspective view of one of the fuse receptacle units and one of the switch units combined.

The fuse receptacle units may be made of porcelain or other suitable insulating material, and, as shown more particularly in Figs. 10, 11 and 14, comprise a base 33, having a pair of cylindrical sockets 34 formed thereon. Each socket is adapted to receive a threaded shell 35 (Fig. 11) which is in general of the same construction as the threaded shell of a lamp socket and each socket is provided with a central contact 36 in the form of a screw passing through the bottom of the socket and adapted to pass through an opening such as 36ª in the base 15 and screw into a threaded opening in an associated bus-bar 22 or 23 or cross-bar of the bus-bar 24. This screw 36 not only serves as a central contact for the fuse receptacle, but also serves as a means for mechanically securing the fuse receptacle unit on the face of the unit base. The threaded shell contact of each fuse receptacle is electrically connected with a branch terminal connector 37. This connector, as shown in Fig. 15, comprises a flat bar or strip of conducting material such as copper. At one end it is widened and has formed therein an opening 38 to receive a central boss 39, on the bottom of the associated socket member 34. Screws 40 pass through an inturned flange of the screw shell 35 and engage threaded openings 40ª in this connector 37 for mechanically holding the connector to the fuse receptacle and electrically connecting it with the threaded shell 35. The opposite end of the connector has a pair of upturned lugs 41, formed thereon, and is provided with a suitable binding-post 42, to which one of the branch wires of the branch circuit is adapted to be connected. The base plate 15 is preferably provided with openings or recesses 43 (Figs. 11 and 27) to permit the binding-post screw 42 to screw home flush on the connector. As will be noted in Fig. 27, for instance, each branch circuit fuse receptacle unit has a pair of these branch wire connectors, one such connector being associated with each socket of the fuse receptacle unit. In the particular basic unit shown in Fig. 8, which is a six-circuit unit, and bearing in mind that the figure is a rear view of the basic unit bus-bars, with the back plate 15ª broken away, the central screws 36 of the unit fuse receptacle at one side will connect respectively into the threaded openings 44 and 45 of the bus-bars 24 and 22, so that the branch circuit wires are connected to the positive and negative side of the circuit by means of these bus-bars, and there is thus a fuse receptacle in each line, positive and negative, of each branch circuit. Similarly, the center contact screws of the next unit fuse receptacle engage with the threaded openings 44ª and 45ª of the bus-bars 22 and 24, respectively, while the center contact screws of the bottom unit fuse receptacle engage with the threaded openings 44ᵇ and 45ᵇ of the bus-bars 24 and 22, respectively. Similar connections which will readily be understood are made with the fuse receptacle units at the opposite side of the panel.

The arrangement is such that in the event any one of the fuse receptacle units becomes damaged or broken, it can be readily removed by disconnecting the two center contact screws of the pair of sockets and a new unit substituted. Since the fuse receptacle units are held in place by the screws 36 engaging the bus-bars, the removal and replacement of a unit fuse receptacle may be accomplished from the front of the panel and without disassembling the unit insulating base member or the bus-bars thereof. It will also be noted that the branch circuit connections are arranged in pairs and side by side on the base. This arrangement gives the most economical arrangement in panel-board construction and at the same time provides the most accessible means for making the connections of the branch circuits. For instance, as illustrated in Fig. 2, both of the terminals of each branch circuit are connected to terminals at the same side of the panel, being connected to the connectors of a pair of fuse receptacles. Thus the two wires of each branch circuit are brought in adjacent each other and connected to a single fuse receptacle unit instead of having one wire connected to one side of the board and the second wire connected to the opposite side of the board, which latter arrangement is apt to result in confusion when it is attempted to wire the board after it is installed.

In order that the branch circuits may be readily distinguished, the base 33 of the fuse receptacle unit may be provided with an opening 46, which is enlarged into a recess 47, as shown in Fig. 14. Placed in this recess is a number plate 48, which is held in position by a suitable spring, such as 49, so that when the branch circuit fuse receptacle unit is placed in position on the board this number is readily observable.

The structure above described comprises in itself a complete basic unit, carrying all of the necessary parts of a panel-board. Thus it consists, in general, of an insulating base having concealed unit bus-bars of a capacity adapted to the demands of the branch circuits associated therewith and arranged on the rear face in grooves so as to be insulated from one another, and unit fuse receptacles on the front face, the fuse receptacles being held in position by mechanical means which clamp the fuse receptacles to the face of the base and electrically connect the same to the bus-bars. The bus-bars may be concealed from the front of the board by placing them in grooves preferably on the back of the board, or otherwise, as may be desired. The only parts exposed on the front of the board are the main and branch terminal connectors. The contacts in the sockets are concealed when the fuse plugs are in position.

As heretofore explained, each basic unit is provided with a bus-bar system of a capacity suited to the demands of the circuits supplied through such basic unit. For example, with a basic unit such as $A^1$, supplying four branch circuits, the unit bus-bars would be of a size and capacity adapted to four circuits. With a basic unit such as $A^2$, supplying six branch circuits, the unit bus-bars would be of a capacity adapted to six circuits, and so on. The bus-bars on each unit are thus reduced to the smallest possible size, with consequent reduction in cost. The unit bus-bar is not called upon to carry any of the current for any other unit.

In combining two or more basic units, in order to provide a panel of increased capacity, I provide main bus-bars of a capacity equal to the total capacity of the combined units. Such main bus-bars—which I shall herein refer to as omnibus-bars, to distinguish them from the unit bus-bars, that is, the bus-bars of the unit basic members— supply all of the basic units, while the unit bus-bars are adapted merely to the capacity of the particular unit and do not have to carry the current for any other unit with which it may be combined. This permits of the unit basic members being constructed and carried in stock without regard to the total capacity of the entire panel-board in which it may be assembled, and a board of any desired capacity may be assembled from the stock units since the bus-bars of each unit need be of a capacity adapted to that unit without regard to the total capacity of the entire combination of units.

In the drawings I have shown several ways in which the omnibus-bars may be arranged to coöperate with the unit bus-bar system.

Thus in Figs. 2, 3 and 4 I have shown two basic units combined with suitable omnibus-bars to supply such units. Referring to these figures, there is illustrated a basic unit $A^1$ of four branch circuits combined with a basic unit $A^3$ of eight branch circuits, and the panel-board thus formed provided with a tail piece having fuses in the main circuit, that is, with a tail piece $B^1$. In this board formed by the combination of these three units, the tail piece $B^1$, as has before been described, is provided with fuse clips 8 in which ordinary fuses 50 are secured. The main or feed wires are connected to the terminals 10, such as binding-posts or the ordinary lugs, on the tail unit $B^1$. The tail member $B^1$ is connected by the connector bars 9 leading from the fuse clips to the terminal binding-posts 26 and 27 of the basic unit $A^3$. These connectors being flat strips of metal clamped to the tail piece and the unit basic member, the tail unit is mechanically and electrically connected with the basic unit $A^3$. The basic unit $A^3$ is connected with the basic unit $A^1$ by means of omnibus-bars 51, one for each feed line, which lie along the back of the back plate $15^a$ of the basic unit. The bottom end of each of these omnibus-bars 51 is turned outwardly, as at 52, and then forwardly, as at 53, to connect with its associated terminal 26 or 27 of the basic unit $A^3$, the end of such omnibus bar being clamped in position by the binding-post which secures the companion connector 9 in place, as shown in Fig. 3. The other ends of these omnibus-bars are turned outwardly and then forwardly, at 54, to connect with the terminals 26 and 27 of the basic unit $A^1$.

In the event more than two basic units are connected together, the omnibus-bar may be arranged as shown in Fig. 22. In this case the lower end of the omnibus-bars are connected to the bottom unit in the same manner as shown in connection with Fig. 3. Connections are made with the intermediate unit by connectors or U-shaped clips 55, while connection is made with the top unit in the same manner as the upper unit shown in Fig. 3. If a greater number of units than three be combined, the U-shaped connectors 55 may be employed for connecting the unit bus-bars of the other intermediate basic units, as will readily be understood.

The omnibus-bars indicated in Fig. 22 are of a capacity adapted to the combined capacity of the three basic units, but, as heretofore explained, the capacity of the bus-bar system of each basic unit is adapted only to the particular basic unit.

The omnibus-bars need not necessarily be throughout their length of a capacity equal to the total capacity of all the units combined as shown in Figs. 3 and 22. For example, the arrangement shown in Fig. 23 may be employed when three or more basic units are assembled into one panel. In this case the omnibus-bars are of sections of decreasing capacity, the section $55^a$ of each omnibus-bar being adapted to the capacity of the three basic units combined, since it carries the current for the three units, while the second section, $55^b$, supplying current to the second and third basic units, may be of lesser capacity.

By reason of the employment of the unit bus-bars for each unit, and omnibus-bars when several units are combined, the unit bus-bars may be made of only sufficient current-carrying capacity for their particular basic unit, thus avoiding the use of bus-bars for each unit of a capacity necessary to carry the current for the succeeding units when several units are combined in a single installation. Therefore, the size and weight of the unit bus-bars may be reduced to the minimum, each basic unit being provided with bus-bars of sufficient capacity only for that size basic unit. When a number of basic units are combined, the omnibus-bars may carry the additional current for all the units, and the size of such omnibus-bars will depend on the number of units combined. The omnibus-bars may range in capacity from, say, a 12-circuit capacity up to a 30-circuit capacity, and may be made in standard stock sizes so that when a plurality of basic units are combined, it is merely necessary to select the proper stock size of omnibus-bar for connecting the basic units together, whereby I am enabled to save materially in the amount of copper used and am enabled to use stock sizes.

In order to give additional strength to the panel where several units are combined to make a panel of increased capacity, so that the panel may be handled freely, shipped freely, and will not become disconnected or broken in placing in position in use, or in shipping, the panel-board made by the combination of two or more basic units or of two or more basic units with a tail piece, is preferably supported and secured in a metallic casing or back piece, which may be of the character shown in Figs. 3 and 4. This metallic casing or back piece consists of a sheet metal channel member or tray 56. Such channel pieces may be made in stock sizes to accommodate the different combinations of basic units and after the units have been combined and connected up, as shown in Figs. 3, 22 and 23, the panel consisting of the several units is laid in and suitably secured to this sheet metal receiver, suitable spacer blocks 57 being interposed between the back of the receiver and the basic units. These spacer blocks 57 consist of insulating material and have their upper faces grooved, as at 57$^a$, to accommodate the omnibus-bars. The spacer members may be placed at any desired intervals. I have found that it is sufficient to place the spacer member wherever two units are joined and to place one at each end as illustrated in the drawings. The basic units are all clamped on to the supporting or back member as by screws 57$^b$, passing through the base of the basic units and the spacer blocks and into the back wall of the tray. The tray is preferably extended beyond the ends of the panel and provided with openings 57$^c$ to receive screws for fastening the panel in place at the point of installation. The spacer blocks 57 space the basic units and consequently the omnibus-bars sufficiently far from the metal of the tray 56 to avoid any danger of short-circuiting.

While for purposes of illustration I have shown in Figs. 2 and 3 a combination of two basic units, A$^1$ and A$^3$, and tail unit B$^1$, it will be obvious that any other combination may be made. For example, any one of the various tail units may be employed to give the desired type of terminal connector and combined with any number of the basic units; or a single basic unit and a tail unit may be combined if desired. The combination of units shown in the drawings is selected merely for the purpose of illustration.

As has been heretofore explained, the basic unit provides a complete panel-board, but one wherein merely fuses are provided for the branch circuits. It is desired in certain instances to provide not only fuses in the branch circuits, but also an individual switch for each branch circuit, so that such branch circuit may be cut off from the main or feed circuit at will and independently of the other branch circuits.

I therefore provide what are herein termed wing units, so-called because when combined with the basic units they provide wings with respect to the basic units. These wing units are designed to carry switches for connection in the branch circuits connected to the panel. These wing units are constructed in sizes or capacities corresponding to the basic units; that is, for each basic unit there is a corresponding wing unit, and since, like the basic units, they may be made in standard sizes, they may be carried in stock so as to be supplied as a stock article and combined with the basic unit. Moreover, the wing units are so constructed that any switch carried thereby may be readily detached from the wing unit for renewal or repair should it become broken or damaged. These wing units which carry the branch circuit switches may be of the construction shown in Figs. 16, 17, 18 and 19. In Figs. 16, 17 and 18, the basic unit is shown combined with the wing unit. I have, however, already described the basic unit and it will merely be necessary now to describe the construction of the wing unit. In the structure illustrated in the above-mentioned figures, I provide an insulating base 58, which base carries the switches for the branch circuits. This insulating base is preferably formed of the same material as the base 15 of the basic unit. Intermediate its sides this base is recessed or channeled longitudinally on its outer face, as at 59 in the structure illustrated in Fig. 18, to receive a corresponding basic unit A, that is, a basic unit of similar capacity, the channel 59 being of such depth that when the basic unit is placed in position the face of the basic unit will lie flush with the face of the two side pieces or wing pieces, as shown in Fig. 7. In other words, I provide a pair of parallel wing members 60 and 61 of a thickness corresponding to the combined thickness of a basic unit having mounted on its back the back cover plate 15ª, and connect these two side pieces or wing pieces by an integral web which is of the thickness equal to the thickness of the back cover plate 15ª heretofore described as used in connection with the basic unit alone. When the basic unit is combined with the wing unit, the cover plate 15ª of the basic unit is dispensed with and the web connecting the two wings takes the place of and serves as the cover plate.

The switches are mounted on these wing sections 60 and 61. The description of one switch will be sufficient as the switches shown are duplicates. It is to be noted, however, that while a push type of switch is shown, this is merely for purposes of illustration, and that any other suitable type of switch may be employed in practice. Each switch shown in the drawings, referring particularly to Figs. 10 and 21, is provided with a pair of branch circuit terminals 62 and 63. These terminals may consist of flat strips of copper the outer ends of which have binding-screws 64 and are provided with upturned lugs 65 to form binding terminals at this point for the reception of the branch circuit wires. It will be noted that each switch is provided with two such binding terminals for the connection of the two wires of a complete branch circuit. These strips extend inwardly and are connected by screws 66 to suitable legs 66ª mounted on an insulating base 67 of the switch, which base also carries a suitable snap switch mechanism, the contacts of which are in electrical engagement with the legs heretofore mentioned. A second pair of legs 68 in electrical engagement with the opposite set of contacts mounted on the base 67 are attached by screws 66 to connectors 69, which in the arrangement illustrated in Fig. 21 are secured to the corresponding terminals of the unit fuse receptacles, so that the branch wire terminals of a fuse receptacle unit are connected with the branch wire terminals of an associated switch. The wires of the branch circuit are then connected to the terminals 64 of the switch instead of the terminals of the fuse receptacle, as in the case where the unit basic members are employed without the wing units. Suitable screws 69ª (Fig. 21) pass through the rear of the base of the wing unit and engage the connectors 62 and 69, and since these connectors are attached by the screws 66 to the legs of the switch mechanism, the latter is thereby secured to the base of the wing unit. Cavities (not shown) in the wing unit receive the ends of the screws 66. This switch mechanism is completely covered by an inclosing box-like cover 70, which is fastened in position by suitable screws 70ª passing through the cover and into a screw-receiving plate 71 mounted on the insulating base 67.

The different wing units, as has heretofore been explained, are constructed of capacities corresponding to the basic units. In other words, the wing unit C¹ is provided with four switches mounted thereon, as shown in Fig. 1, to correspond in capacity with the basic unit A¹ with which it is designed to be combined, and so on with each of the other wing units. The switches on the wing units, it will be noted, correspond to the branch circuit fuse receptacle units on the basic unit A¹ and when the basic unit A¹ is combined with the wing units and the connectors connected up, a complete panelboard is formed having switches and fuses in each of the branch units. The same is true when any of the other basic units is combined with its associated wing unit, or when two or more basic units combined are assembled with associated wing units.

The exposed connectors on the face of the panel may, if desired, be covered with an insulating varnish.

It is sometimes desired to provide a panel board of this character wherein there are no exposed live parts; in other words, to provide what may be termed a "dead front" board. The switch covers may therefore be provided with an extension 72, as shown in Fig. 16, which houses and covers the connectors 62 and 63 of the switch, as well as its terminals 64, and at the opposite side with a second extension 73 which houses and covers the connectors leading from the fuse receptacles to the switches. In Fig. 16 I have shown some of the switch covers with the extension 72 alone, and other switch covers with both extensions 72 and 73. When both of these extensions are employed all of the live parts associated with the fuse receptacles and switches which would otherwise be exposed at the front of the board are effectually concealed and insulated. These extensions 72 and 73 are slotted, as at 73ª, for the passage of the connectors or branch circuit wires, as the case may be. There may also be provided a box-like cover 74 of insulating material for the end terminals of the basic unit, as shown in Figs. 16, 17 and 18. This cover when in position incloses the end terminals, being provided with slots 74ª at the bottom edge to permit of the passage of the connectors or omnibus-bar terminals when several units are combined. Screws 74ᵇ passing through the cover and ribs 74ᶜ formed thereon and engaging the base serve to secure the cover 74 in position. These covers conceal all of the live parts so as to provide a "dead front" panel.

As already pointed out, the unit bus-bars of the basic units are concealed from the front of the board, and the omnibus-bars, when a plurality of basic units are combined, are also concealed, being located back of the basic units. There are therefore no live parts on the front of the panel with the exception of the terminals and connectors. By the employment of the switch covers having extensions to cover the connectors between the fuse units and the switches, as well as the branch circuit terminals, and the covers for the end terminals, a "dead front" panel is provided, that is, one in which there are no exposed live parts on the face of the panel. These housings for the terminals and connectors are not essential and ordinarily are not employed, the connectors being merely painted with the insulating varnish. In special cases, however, more effective protection of exposed parts is called for and in such special cases the connector and terminal housings may be provided.

While in the preferred form I use a wing unit wherein the two side members 60 and 61 are connected by an integral web to form a back plate for the basic unit, as shown in Fig. 18, I may if desired use a structure such as is illustrated in Fig. 19 for the wing unit. In this arrangement the two side wing members 60 and 61 are made individually and are mounted on suitable channel bars 75, being spaced apart a sufficient distance to receive a basic unit with its back plate 15ª, the basic unit being secured by screws or other securing means upon the channel irons to make a complete combined basic and wing unit. Also, if desired, instead of using two side members 60 and 61, I can dispense with one side wing and use only one, having the branch circuits extend from one side of the panel only. This, of course, could also be done in the structure illustrated in Fig. 16 if desired. The channel members 75 at their ends are provided with screw-receiving openings 76 and 77. Screws passing through the openings 77 serve to secure the panel-board in position in its cabinet or to any other suitable support, while the openings 76 are provided for attaching the corner irons of a suitable insulating barrier surrounding the unit. This barrier will be described more fully hereinafter.

Instead of providing connectors between the fuse receptacle terminals and the switches as illustrated in Fig. 21, when the basic unit is assembled with a wing unit, I may employ for the branch wire terminal connectors 37 a different form of connector as illustrated in Fig. 10. Thus in this arrangement I substitute for each pair of connectors 37 and 69 of Fig. 21 a single connector 78 which is long enough to extend from the fuse receptacle unit and connect directly with the associated switch leg by means of the screws 66, the connectors 78 being secured to the base by suitable screws passing through openings 78ª.

When a wing unit is assembled with a basic unit in the arrangement shown in Fig. 21, the switch covers are removed and the connectors 69 detached from the wing unit. The basic unit is then secured in place on the wing unit and the connectors restored and attached by the screws 42 to the associated fuse receptacle connectors 37. In combining a basic unit with a wing unit in the arrangement shown in Fig. 10, the switch covers are removed and the connectors 78 from the fuse receptacles connected to the legs of the switch. A simpler arrangement for assembling the basic and wing units is shown in Fig. 32. As there shown the switches are provided with terminals 79 which are located on the wings adjacent the edge thereof, no part of the switch or its terminals overhanging such edge. With this construction the basic unit may be slipped or dropped in position between the two wings of the wing unit and the associated terminals of switch and fuse receptacle connected by links 79ª secured to the connectors 79 and 37 by screws, as shown, thereby avoiding the removal of the switch terminals or disturbing the terminals of either wing unit or basic unit. In Fig. 32 some of the links are shown in position, while in others they are removed.

As has been pointed out, I am enabled to provide from a combination of a stock wing unit and a stock basic unit a switch panel which in itself comprises a complete panelboard. It is obvious, of course, that different sizes may be used instead of the 4, 6, 8 and 10 circuit boards, but I have found that these are the most satisfactory in commercial practice and that by the combination of these basic units and switch units of various capacities, I am enabled to produce a switch panel of any capacity within practical requirements.

When the basic units alone are combined I may use as the supporting frame the tray-like member 56 (Figs. 2, 3 and 4), although any other suitable supporting frame may be employed. With the combined basic unit and wing unit panel used with a tail unit or a plurality of the combined basic units and wing units, either with or without a tail unit, I prefer to use a supporting frame which also serves suitably to space the panel from the back of the cabinet usually employed, without the need of using insulating blocks such as are employed with the tray 56 shown in Fig. 4. This supporting frame may consist of angle bars 80 as shown in Fig. 18, having attaching feet 80ª, or of channel bars 81, as shown in Figs. 5, 6, 7, 24 and 25. These bars, such as the channel bars 81, constitute a supporting frame upon which the stock units may be mounted so that the complete panel of the capacity desired may be shipped by the factory or jobber ready for installing, the only work then required being to connect the branch circuits and main feed wires to the proper terminals. The channel bar frame serves rigidly to secure the units together to form a complete panel and to facilitate shipping and installing the panel, and when installed the channel bars space the back of the panel from the wall against which the panel is mounted, sufficiently to insulate properly the omnibus-bars from such wall, thereby avoiding danger of short circuits.

The channel bars 81 providing the supporting frame may be made up in lengths corresponding with any combination of units that may be called for and therefore constitute unit frame members which may be carried in stock at the factory or by the contractor or jobber, thereby avoiding the necessity of special construction to meet any particular character of installation.

As shown in Figs. 5 and 6, the four-circuit switch panel unit and the eight-circuit switch panel illustrated are mounted on the channel bar frame one above the other with the tail piece at the bottom, and are secured on the frame by screws 82 which pass through suitable holes in the base and enter the channel bars 81. These holes, when a combined basic unit and wing unit are used alone, provide holes through which screws may pass for supporting the unit on any base on which it is to be mounted, or in the inclosing panel cabinet which is usually required by the Board of Fire Underwriters.

The basic units, when combined with wing units, are each provided with bus-bars of sufficient capacity only for that particular size unit, as explained when describing the basic units, and therefore when two or more of the combined basic and wing units are employed in the same panel-board I provide, as shown in Fig. 6, omnibus-bars 51, the same as when the basic units alone are combined. These omnibus-bars are connected with the individual units in the same manner as is the case of the basic units alone, as shown in Figs. 2 to 4.

In some instances, instead of mounting the units, whether the basic units alone or when combined with the wing units, one above the other, as shown in Figs. 2 and 5, to provide a board of increased capacity, it may be desired to mount such units side by side. Under such circumstances space must be provided for bringing the wires of the branch circuits up from beneath the panels to a position to connect to the branch circuit terminal connectors at the sides of the units, To provide for such arrangement of units, I employ the spacer units E heretofore referred to in connection with Fig. 1. These spacer units are provided with notches 13ª at their edges so that when placed between one or more pairs of panel units and the panels secured in position close against its side edges, openings will be left for the bringing through of branch wire ends. These spacers are made in standard stock sizes, one for each size of basic unit, with the notches cut to coöperate with the branch wire terminals of the corresponding basic units or combined basic and wing units. The length of the spacer units varying according to the size of the basic units, due to the fact that the wing units and basic units are made in corresponding sizes, these spacer members may be used either with the basic units alone, or with the combination of the basic units and the wing units which form fused switch panels. For purpose of illustration, an arrangement of the combination of two basic units arranged side by side to form a panel of increased capacity is shown in Fig. 26, wherein there are shown two 10-circuit basic units arranged side by side to give a panel of 20 branch circuit capacity, with a spacer unit, in this case $E^4$, interposed between the two basic units. Similarly, a plurality of basic units arranged end to end, as in Fig. 2, may be located at the side of a similar plurality of basic units, corresponding spacer units being employed to separate the adjacent units. The spacer units may also be used when the basic units are combined with the wing units, as will readily be understood without further explanation.

When the units, whether the basic units alone or combined with wing units, are arranged side by side, as above described, the units are preferably secured to a supporting frame consisting of top and bottom connecting channel bars 83, the spacer unit being also secured at its ends to such bars.

Where a panel consisting of either the basic units alone or when combined with wing units, is to be housed within a cabinet, the Underwriters require that the panel be surrounded by a barrier to provide a gutter located between the walls of the cabinet and the barrier, for the branch circuit wires leading into the panel, and to prevent the wires from being drawn across the front of the panel or otherwise being misplaced. I have previously referred to this barrier in connection with Fig. 1, and explained that such barrier is of unit construction, that is, made up into the form of units capable of being assembled for the various combinations of panel units.

In order to show how a panel is mounted in a cabinet, and the arrangement of the barrier, I have illustrated in Figs. 24 and 25, in connection with such cabinet, a panel consisting of a basic unit and combined wing unit, together with a tail unit. The cabinet 84 is usually of sheet metal of a size adapted to the particular panel, and is provided in its walls with suitable openings 84ª for the passage to the panel of the main feed wires and the branch circuit wires.

The panel, the units of which are secured to the channel bar frame, has a surrounding barrier designated as a whole by 85, made up of barrier units, which may if desired be of the same material as the base of the basic units. As shown in Figs. 24 and 25, the barrier 85 consists of two side units 86 and two end units 87 which together form an inclosed open-front box for the panel, suitable slots 14 being formed at the bottom edges of the barrier units for the passage to the panel of the necessary circuit wires. As a rule the top unit of the barrier does not require such slots, but in order that the manufacture may be standardized, the members constituting the top units of the barrier may be notched the same as the bottom. The barrier units are supported and held in position about the panel by means of right-angle corner irons 88, having feet 89 which are secured to the channel bars 81. The sides of the corner irons are slotted, at the top, as at 90, and through these slots pass bolts 91 which also pass through the ends of the barrier units and receive wing nuts 92, whereby the barrier is securely held in position. The corner irons 88 being slotted, as shown, by loosening the nuts 92 the barrier units may be adjusted up and down as required for proper adjustment. If it is desired to remove any one of the barrier units, all that is necessary is to loosen the two wing nuts securing it in place, and the unit can be bodily removed out of position without disturbing the remaining units of the barrier.

When several panel units are combined end to end in a single panel the side barrier units associated with the several panel units may be suitably connected and supported by the side plates 93, as indicated in Figs. 30 and 31. Thus the abutting ends of two side barrier units, such as $F^1$ and $F^4$, are secured by bolts 91 and wing nuts 92 to the plate 93, in a manner similar to that employed for connecting the adjacent ends of the panel units at the corners of the panel, the plate being slotted as in the case of the corner irons 88. The inner end of the plate 93 is secured to the channel bar, as by screws 94, to fasten the side plate 93 in place.

As shown in Fig. 24, the panel is secured in the cabinet by suitable fastening means, such as screws 95, which pass through the holes $95^a$ in the extended ends of the channel bars 81 constituting the supporting frame and enter the back wall of the cabinet.

When the panel is mounted in the cabinet there is provided between the barrier 85 and the walls of the cabinet a gutter or well 96 providing ample space for the necessary wires leading to the panel and to make connections with such wires to the panel terminals. This well is covered by a plate 97 which is removably secured in position as by screws 98. The cover plate is provided with an opening substantially of the area of the panel, which opening is closed by a hinged door 99 having a suitable fastening device, such as a latch 100. The cover plate when removed permits access to the gutter in the cabinet to enable the circuit connections to be made with the panel, while then the cover plate is in position access to the face of the panel may be had by the door 99.

As shown in Figs. 5, 7 and 25, the channel bars 81 of the supporting frame may project laterally beyond the side edges of the panel units so as to provide a seat for the side barrier units.

As has before been described, the barrier is made up as standard stock units, such as are illustrated at F in Fig. 1. It will be noted that the side members of the barrier may consist of four units, there being a side unit corresponding in length with each capacity of basic unit. There are also two standard stock sizes for the top and bottom units of the barrier, these being designated $F^5$ and $F^6$. The unit $F^5$ is of a length corresponding to the width of the basic units, and the other of a length corresponding to the width of a wing unit. Under ordinary circumstances these six barrier units will be found to be ample. However, if the panel is of a length such that an additional side piece is required to be cut to fill out, it may be secured in place and connected to the adjacent barrier unit by a side plate such as is shown in Figs. 30 and 31.

This application, so far as concerns common subject-matter, is a continuation of my applications as follows:

Serial No. 632,883, filed June 13, 1911;
Serial No. 794,155 filed October 8, 1913;
Serial No. 53,010, filed September 28 1915; and
Serial No. 128,133, filed October 27, 1916;

Having thus described my invention, what I claim as new and desire to secure by Letters Patent is—

1. In the panel-board art, a structure comprising a plurality of portable interfitting basic units of varying capacities, a bus-bar system for each basic unit of a capacity individual to said unit, and circuit-controlling apparatus mounted on each of said units, said circuit-controlling apparatus being connected in multiple to the individual bus-bar system of said unit.

2. In the panel-board art, a plurality of portable basic units of varying capacities, circuit-controlling apparatus mounted on each of said units, said units being usable individually, or in combination to provide a panel of greater capacity than a single unit, a bus-bar system for each unit of a capacity individual to said unit, said circuit-controlling apparatus being connected to said bus-bar systems in multiple, and means for connecting one or more of said units in circuit.

3. In the panel-board art, a plurality of basic units of similar construction but of varying capacities, circuit-controlling apparatus corresponding to the capacity of each unit mounted on such unit, branch wire terminals connected to said circuit-controlling apparatus, an individual bus-bar system carried by each unit of a current-carrying capacity corresponding to the capacity of said unit, to which the circuit-controlling apparatus is connected in multiple, and an omnibus-bar system common to the plurality of the basic units.

4. In the panel-board art, a plurality of portable basic units, circuit-controlling apparatus mounted on each of said units, a bus-bar system for each basic unit of a capacity individual to said unit, to which said circuit-controlling apparatus is connected in multiple, means for mechanically holding a plurality of said basic units in assembled relation to form a panel-board, and an omnibus-bar system to which the individual bus-bar systems are connected in multiple.

5. In the panel-board art, a plurality of panel-board units, an individual bus-bar system for each unit, terminal connections for each such bus-bar system, circuit-controlling appliances mounted on each unit and connected in multiple to the bus-bar system of such unit, means to secure two or more of said units in assembled relation, and an omnibus-bar system comprising standardized lengths of conductors to which said basic unit terminals are connected in multiple, said connection being readily removable to facilitate interchangeability.

6. A panel-board of the type described comprising, in combination, a plurality of unitary sections each of which constitutes a complete panel-board, a plurality of circuit-controlling appliances on each section, an individual current-feeding bus-bar system for each section to which said appliances are connected in multiple, means for assembling one or a plurality of said sections into a panel-board of the capacity of one or the combined capacities of the several sections, and an omnibus-bar system comprising standard lengths of conducting bars to which said individual current-feeding bus-bar systems are connected in multiple, said connection being readily removable to facilitate interchangeability.

7. A panel-board of the type described comprising, in combination, a plurality of portable unitary sections, a plurality of circuit-controlling appliances on each section, an individual current-feeding bus-bar system for and carried by each section to which said appliances are connected in multiple, means to secure the plurality of sections in assembled relation, and an omnibus-bar system to inter-connect said systems in multiple to the current supply, said inter-connections being readily removable to facilitate interchangeability.

8. In the panel-board art, a basic unit, a wing unit secured thereto, circuit-controlling devices on each of said units, and a bus-bar system individual to the circuit-controlling devices of one of said units, and through said current-controlling devices to the circuit-controlling devices of the other unit.

9. In the panel-board art, a basic unit, a plurality of circuit-controlling devices mounted on said unit, a bus-bar system individual to said unit and connected to said circuit-controlling devices, a wing unit assembled with said basic unit, other circuit-controlling devices mounted on said wing unit, said last-mentioned devices being adapted to be connected to individual branch circuits.

10. In the panel-board art, a basic unit comprising a base, circuit-controlling apparatus mounted on said base, a bus-bar system individual to and secured to said base, said apparatus being connected to the bus-bar system, a wing unit assembled with said basic unit, said wing unit comprising a base, circuit-controlling equipment individual to branch circuits mounted on said wing-unit base, means for securing the unit bases in assembled relation, and connections between the circuit-controlling apparatus mounted on the basic unit and the circuit-controlling apparatus mounted on said wing unit.

11. A panel-board unit comprising, in combination, a plate of insulating material having a recess formed therein providing a lateral wing at each side of said recess, an insulating front plate fitting in said recess, one of said plates having depressions in its meeting face, bus-bars mounted between said plates in said depressions, and circuit-controlling equipment comprising fuse receptacles and switches mounted on the front face of the said plate and the lateral wings and connected to said bus-bars.

12. A panel-board unit comprising, in combination, a pair of insulating plates arranged face to face, bus-bars arranged between said plates, one of said plates having its meeting face recessed to accommodate said bus-bars, the said bus-bars being held in position when said plates are secured together, fuse receptacles mounted on the front face of said unit, each comprising an insulating base, threaded shell and center contacts mounted in said receptacle base, a conductor strip connected to one of said contacts, the other contact being electrically and mechanically connected with one of the bus-bars, a switch mounted on said unit, and a branch terminal conductor connected to the switch.

13. In the panel-board, the combination with a basic unit comprising a plate of insulating material having recesses on its rear surface, bus-bars mounted in said recesses, circuit-controlling apparatus mounted on the front face of said plate, means electrically connecting said apparatus with said bus-bars and mechanically holding the bus-bars and apparatus in position on said plate, of an insulating cover-plate for the rear face of said base unit and which incloses said bus-bars, an insulating wing extending laterally from each side of said cover plate, circuit-controlling apparatus and terminals mounted on said wings, and conductors extending between the apparatus mounted on said wings and the apparatus on said basic units.

14. In a panel-board, the combination with a basic unit comprising a flat plate of insulating material, bus-bars mounted on the rear face of said plate, circuit-controlling apparatus mounted on the front face of said plate, means extending through said plate electrically interconnecting said apparatus and bus-bars and mechanically securing said apparatus and bus-bars to the plate, of a wing member comprising a cover-plate for said basic-unit plate, the meeting face of one of said plates being recessed to accommodate the bus-bars, a pair of wing bases one on each side of said cover-plate integrally formed therewith and of a thickness substantially equal to the combined thickness of said plates, circuit-controlling apparatus mounted on said wing bases, and conductors interconnecting the apparatus mounted on said basic unit with the apparatus mounted on said wing bases.

15. In the panel-board art, a plurality of basic units of different capacities, bus-bars and circuit-controlling apparatus carried by each of said basic units, a wing or side unit for each basic unit and of a capacity corresponding thereto, other circuit-controlling apparatus carried by each of said wing units, said basic units and wing units being constructed for combination to form a panel-board of the desired capacity, and suitable means for connecting said units electrically and mechanically in assembled relation.

16. The combination with a plurality of panel-board units, each unit comprising a pair of insulating plates arranged face to face, bus-bars arranged between said plates and held in position between said plates when the plates are secured together, at least one of said plates having its meeting face recessed to accommodate the bus-bars of the panel-board, fuse receptacles mounted on the front face of said base units and electrically connected with the bus-bars, securing means for said receptacles, each of the said bus-bars having a terminal extension electrically connected therewith and lying on the front face of the base, and omnibus bars connecting the corresponding bus-bars of one panel-board unit with the bus-bars of the next succeeding panel-board unit.

17. The combination with a plurality of panel-boards, each board having a base unit comprising a pair of insulating plates arranged face to face, the meeting face of at least one of said plates being recessed, bus-bars mounted in said recesses and held in position when the plates are secured together, circuit-controlling apparatus mounted on the front face of the board, securing means for said apparatus extending through the front plate and electrically and mechanically connecting said apparatus to the bus-bars, terminal extensions lying on the front face of the board, means for mechanically securing the panel-boards together in alinement, and omnibus bars connecting each of the bus-bar terminal extensions of the panel-board with the corresponding bus-bar terminal extension of the next succeeding board, said connecting strips being arranged on the back of the plurality of boards.

18. A panel-board of the type described comprising, in combination, a plurality of panel-board units, an individual bus-bar system for each unit, circuit-controlling appliances mounted on each unit and connected in multiple to the bus-bar system, a second unit provided with circuit-controlling appliances and associated with each of the first mentioned units, means to hold in assembled relation a plurality of said first and last mentioned units, means to serially interconnect said circuit-controlling appliances of said first-named unit with the circuit-controlling appliances of said second-named unit, and an omnibus-bar system to which said individual bus-bar systems are connected in multiple, said connections being readily removable to facilitate interchangeability.

19. In the panel-board art, a plurality of portable basic units of varying capacities, circuit-controlling equipment carried by each of said units, a bus-bar system individual to each of said units to which the circuit-controlling equipment of such unit is connected in multiple, said units being constructed for use individually or in combination with other of said basic units, a plurality of end or tail units having varying forms of terminal connections, each of which is usable with said basic units to form a panel-board of the capacity desired, means to hold in assembled relation one or more of said basic units and a tail unit, and means to conductively connect said individual bus-bar systems in multiple to the terminal connections of said tail units.

20. In the panel-board art, a plurality of basic units of varying capacities, circuit-controlling equipment for branch circuits mounted on each of said units, a bus-bar system individual to each of said units, to which the circuit-controlling equipment thereof is directly connected in multiple, each of the aforesaid units being constructed for assembly with any other of said units of the same or different capacity, an omnibus-bar system common to a plurality of assembled basic units, a plurality of tail units, feed-wire connections of varying forms mounted on said tail units, any one of said tail units being adapted for assembly individually with the combined basic units, connections between said tail units and the omnibus-bar system, and means for holding the combined basic units and tail unit in assembled relation.

21. In the panel-board art, a plurality of basic units, circuit-controlling devices mounted on each of said units, a bus-bar system for each basic unit of a capacity individual to said unit, a plurality of wing units one for each of said basic units, circuit-controlling devices carried by each of said wing units, a plurality of tail units, terminal connections of varying forms mounted on said tail units, one of said tail units being used in combination with said basic units to form a panel-board of the capacity desired, means for mechanically holding a plurality of said units in assembled relation to form a panel-board, and an omnibus-bar system for electrically connecting the individual bus-bar systems with a supply circuit.

22. In the panel-board art, a plurality of basic units of varying capacities, circuit-controlling apparatus for branch circuits carried by each of said units, a bus-bar system individual to each of said units, to which the apparatus thereof is directly connected in multiple, a plurality of wing units, other branch circuit-controlling apparatus carried by said wing units, the said wing units having capacities corresponding to the basic units and each being constructed for assembly with a basic unit of the same capacity, a plurality of tail units, and feed-wire connections of varying forms associated with said tail units, said tail units being adapted for combined use with said basic units and wing units.

23. In the panel-board art, a plurality of basic units of varying capacities, circuit-controlling apparatus for branch circuits mounted on said units, a bus-bar system individual to each of said units, to which said apparatus is directly connected in multiple, each of said units being constructed for assembly with any other unit of the same or different capacity, an omnibus-bar system common to a plurality of assembled basic units, a plurality of wing units of capacities corresponding to the basic units and constructed for assembly therewith, other circuit-controlling apparatus mounted on said wing units, a plurality of tail units, feed-wire connections of different forms associated with said tail units, said tail units being adapted for assembly individually with the combined basic and wing units, and connections between said tail units and the omnibus-bar system of the assembled basic units.

24. In the panel board art, the combination with a base and a plurality of circuit controlling devices, of a unitary stock bus-bar having a terminal at one end and permanent cross-connecting bars intermediate its ends.

25. In the panel board art, the combination with a base and a plurality of circuit controlling devices, of a unitary stock bus-bar having an end terminal permanently affixed thereto and permanent cross-connecting bars at points along the said bus-bar.

26. In the panel-board art, a plurality of basic units, circuit-controlling devices mounted on each unit, a bus-bar system for each unit of a capacity individual to said unit and to which said devices are connected, said bus-bar system being concealed from the front of said unit, connection terminals associated with the bus-bar system of each unit, said terminals being exposed on the front of said unit, and an omnibus-bar system on the rear of said assembled units connected with the connection terminals on the front of said units.

27. In the panel-board art, a plurality of basic units, circuit-controlling apparatus mounted on each unit, a bus-bar system for each unit of a capacity individual to such unit and to which the circuit-controlling devices thereof are connected, said bus-bar system being concealed from the front of said unit, connection terminals associated with said bus-bar system, said terminals extending to and being located on the front of said unit, wing units combined with the basic units, other circuit-controlling apparatus carried by the wing units, means for mechanically supporting a plurality of said basic units and wing units in assembled relation to form a panel-board, and an omnibus-bar system at the rear of said assembled units and connected with said connection terminals.

28. In the panel-board art, a plurality of basic units, circuit-controlling devices mounted on each unit, a bus-bar system for each unit of a capacity individual to such unit and to which the circuit-controlling devices thereof are connected, said bus-bar system being located at the rear of and concealed from the front of said unit, connection terminals for said bus-bar system located at the front of said unit, a tail unit, connection terminals for the tail unit, mechanical means for supporting a plurality of said basic units in assembled relation with said tail unit to form a panel-board, and an omnibus-bar system on the rear of said assembled units and connected with said connection terminals of the combined basic and tail units.

29. In the panel-board art, a plurality of basic units, circuit-controlling apparatus mounted on each unit, a bus-bar system for each unit of a capacity individual to such unit and to which said circuit-controlling devices are connected, said bus-bar sytem being concealed from the front of said unit, connection terminals for said bus-bar system located at the front of said unit, a plurality of wing units, other circuit-controlling apparatus mounted on said wing units, said wing units being assembled with said basic units, a tail unit, suitable connection terminals mounted on said tail unit, means for mechanically supporting a plurality of combined basic and wing units and a tail unit in assembled relation to form a panel-board, and an omnibus-bar system on the rear of said assembled units and connected with said connection terminals of the basic and tail units.

30. In the panel-board art, a plurality of panel-board units, a supporting frame therefor, an insulating frame comprising side, top, and bottom insulating members extending at right angles to the supporting frame and mounted thereon, and a notched spacer member mounted on the supporting frame to space apart the panel-board units.

31. In the panel-board art, a plurality of basic units, circuit-controlling equipment mounted on each of said units, a bus-bar system individual to each of said units to which said circuit controlling equipment is connected, said basic units being adapted to be mounted side by side, and a spacer unit interposed between said basic units, said spacer unit having provision to accommodate the branch circuit wires connected to said equipment.

32. In the panel-board art, a plurality of basic units of varying capacities arranged end to end, circuit-controlling equipment and terminals for branch wire circuits carried by each of said basic units, a bus-bar system for each of said units of a capacity individual to said unit, spacer units, one for each length of basic unit and adapted to be interposed between pairs of corresponding basic units arranged side by side, the said spacer units having passages corresponding with the terminals on the basic units to accommodate the branch circuit wires connected to such terminals.

33. In the panel-board art, a plurality of basic units of different capacities arranged end to end, circuit-controlling apparatus mounted on each of said units, a bus-bar system for and of the capacity of each of said units, wing units of capacities corresponding to the basic units, other circuit-controlling apparatus mounted on said wing units, each of the said wing units being assembled with a corresponding basic unit, branch circuit terminals associated with the circuit-controlling apparatus mounted on the said wing units, and spacer units, one for each length of basic unit, interposed between pairs of corresponding assembled basic and wing units, said spacer units having passages at the sides thereof to accommodate the branch circuit wires connected to the terminals of the wing units.

34. In the panel-board art, a plurality of basic units of different capacities, each of said units comprising an insulating base and an individual bus-bar system of the capacity of said units, said bus-bar system being inclosed within the base, terminals associated with said bus-bar system, said terminals extending to and being exposed on the face of said base, wing units of capacities corresponding to each of said basic units and assembled therewith, branch circuit-controlling apparatus mounted on each of said wing units, a frame on which a plurality of the combined wing and basic units are mounted, and an omnibus-bar system common to all the basic units, located at the rear of said basic units and connected to the bus-bar terminals of said units.

35. In the panel-board art, a plurality of basic units, branch-circuit controlling apparatus carried thereby, said units being arranged end to end, a bus-bar system individual to each of said units, a wing unit for each basic unit of similar capacity, other branch circuit-controlling apparatus mounted on said wing units, a tail unit combined with said basic and wing units, a frame on which all of said units are mounted, omnibus-bars common to all of said basic units, and a rectangular barrier inclosing the combined units, said barrier comprising sections having notches for the passage of the external circuit conductors, and means for securing the barrier sections in position.

36. In the panel-board art, a plurality of basic units arranged end to end, branch circuit-controlling apparatus carried by each of said units, a concealed bus-bar system for each of said basic units, end terminals associated with each of said bus-bar systems, said terminals being exposed on the face of said units, concealed connections between said apparatus and the bus-bar system, a wing unit assembled with each basic unit, other branch circuit-controlling apparatus mounted on the wing units, connections between the apparatus mounted on the basic units and the apparatus mounted on the associated wing units, terminals associated with the apparatus mounted on the wing units, said terminals serving as connecting means for the branch circuit-connections, a concealed omnibus-bar system connected to the end terminals of the several basic units, an insulating cover for inclosing the connections between the apparatus mounted on the basic units and the wing units, and a cover for housing the bus-bar and omnibus-bar terminals on each basic unit.

37. In the panel-board art, a plurality of basic units, circuit-controlling apparatus mounted on said units, individual bus-bar systems for each unit to which the circuit-controlling apparatus of the unit is connected, a plurality of barrier units, said units consisting of end units and side units substantially equal in length to the width and length, respectively, of said basic unit, said barrier units when assembled providing a continuous rectangular barrier inclosing the basic units, and means for securing the barrier units together.

38. In the panel-board art, a plurality of basic units of different capacities, circuit-controlling apparatus mounted on said units, an individual bus-bar system for each unit of the capacity of such unit to which the circuit-controlling apparatus of each unit is connected, a frame on which the units are mounted, an omnibus-bar system common to all the units, a rectangular barrier surrounding the combined units and consisting of side and end units, each end and side unit being substantially equal in length to the length and width, respectively, of the basic units, and means for securing the barrier units in position.

39. In the panel-board art, a base having a branch circuit fuse receptacle mounted thereon, bus-bars therefor concealed from the front of the base, a switch mounted on the front of the base and connected to the fuse receptacle, having branch circuit terminals mounted on the base, and a switch-cover having an extension for housing the branch circuit terminals.

40. In the panel-board art, a base having a branch circuit fuse receptacle mounted thereon, bus-bars therefor concealed from the front of the base, a switch mounted on the front of the base and connected to the fuse receptacles and having branch circuit terminals located on the front of the base, and a switch-cover having an extension for housing the branch-circuit terminals and connections between the switch and the fuse receptacle.

41. In a device of the character described, a panel board base unit comprising in combination, an insulating base having a plurality of grooves in the rear face thereof and having screw receiving openings extending from the grooves to the front face of the board, a plurality of bus-bars all mounted on the rear face of said base having threaded openings therein and fitting in said grooves and held by the side walls of said grooves with their openings alining with the openings in the base, an insulating cover plate fitting on the back of said base and covering substantially the entire back surface of said base, insulating the bus-bars and holding the bus-bars in said grooves independently of the electrical apparatus on the panel, and means on the front face of the board for electrically connecting the bus-bars with the supply wires without removing the cover plate.

42. In a device of the character described, a panel board base unit comprising in combination, an insulating base having a plurality of elongated grooves in the rear face thereof and having screw receiving openings extending from the grooves to the front face of the base, the base having an opening at the end of each of said grooves extending through to the face thereof, a plurality of bus-bars all mounted on the rear face of said base, and each comprising in a unitary device a conducting strip and a line terminal extension, the extension lying in a different plane from that of the conducting strip and passing through the opening at the end of the recess in which said bus-bar fits and lying on the front face of the base, said bus-bars having threaded openings therein, held in alinement with the openings in the base by the side walls of said grooves, and a cover plate of insulating material fitting on the back of said base insulating said bus-bars and holding them in the grooves independently of the electrical apparatus on the panel.

43. In a device of the character described, a panel board base unit comprising in combination, an insulating base having a plurality of elongated grooves in the rear face thereof and having screw receiving openings extending from the grooves to the front face of the base, said base having an L-shaped opening therein communicating with the end of one of said grooves and extending through to the front face of the base, a plurality of bus-bars all mounted on the rear face of the base, having screw receiving openings therein and fitting in said grooves, each comprising a unitary device formed of a conducting strip, and a substantially L-shaped line wire terminal extension passing through the L-shaped opening, said extension being offset from the conducting strip lying in a plane different from the plane of the conducting strip extending through said L-shaped opening and lying flat on the front face of said base, the side walls of the grooves holding the openings in the bus-bars in alinement with the openings in the base, and a cover plate of insulating material for said base insulating the bus-bars and holding the same in the grooves.

44. In a device of the character described, a panel board base unit comprising in combination, an insulating base having a plurality of grooves in the rear face thereof and having screw receiving openings extending from the grooves to the front face of the base, certain of said grooves at predetermined points being wider than the remaining portion of the grooves, a plurality of bus-bars all mounted on the rear face of the base and having threaded openings therein, fitting in said grooves and held by the side walls of said grooves with their openings alining with the openings in the base, at least one of said bus-bars having laterally extending branches overlapping another of the bus-bars, insulating strips interposed between said overlapping portions and mounted in the widened portions of the grooves, said strips being held against lateral displacement by the side walls of the grooves, and a cover plate of insulating material fitting on the back of said base and holding said bus-bars and insulating strips in the grooves.

45. In the panel board art, a panel board base unit comprising in combination an insulating base having a groove in the rear face thereof, a substantially L-shaped opening in said base connecting with one end of said groove, a bus-bar fitted in said groove, a substantially L-shaped line terminal extension integral with said bus-bar, said terminal extension lying on the front face of said base, and a cover plate for said insulating base which retains said bus-bar in position in said groove.

46. A receptacle comprising an insulating base having a substantially cylindrical recess, a threaded shell contact mounted in said recess, said base having an opening therethrough, said opening having a shoulder, and a number plate held in said opening against said shoulder.

47. A panel board base unit comprising in combination, a flat front member and a flat rear member formed of insulating material, the meeting face of at least one of said members being recessed to accommodate the bus-bars of the panel board, bus-bars mounted between said members having screw threaded openings to receive securing means for removably securing a plurality of electrical equipment units to the front face of the board and being held in position and against displacement independently of said securing means, the front face of the front member having a flat face free from projections, and means for connecting the supply wires to the board without separating the members of the base unit.

48. A panel board base unit comprising a flat front member having its front face flat and unobstructed, and a flat rear member of insulating material, the meeting face of at least one of said members being recessed or channeled to accommodate the bus-bars of the panel board, bus-bars mounted between said front and back members and held against plane movement by the side walls thereof and against movement in any other direction by being clamped between the front and back members, said bus-bars having screw threaded openings to receive the screws for securing the electrical equipment to the board and electrically connecting the same with the bus-bars.

49. A panel board comprising flat front and rear members, the front face of the front member being free and unobstructed, the meeting face of at least one of said members having a plurality of longitudinally extending elongated channels and a plurality of relatively short transverse channels, a bus-bar system comprising a plurality of elongated bars fitting in the long channels, and a plurality of cross bars fitting in the short channels, said bus-bar system being held in place by being clamped between the two members of the board, said front member having a plurality of openings therein for the accommodation of the securing means for the electrical equipment, which securing means extends into the board and engages the bus-bars.

50. In the panel board art, a base carrying circuit controlling devices on the front thereof, a bus-bar system wholly concealed from and individual to the base and having main and branch connection terminals accessible from the front of the base, and multiple connections between said circuit controlling devices and said bus-bar system, said main connection terminals for said bus-bar system being positioned on the front of said base.

51. In the panel board art, a base, a bus-bar system wholly concealed from and individual to said base, circuit controlling devices detachably secured to the front of said base, and detachable means for completing multiple electrical connections between said circuit controlling devices and said bus-bar system and removable and detachable wholly from the front of said base, and connection terminals for said bus-bar system located on the front of said base.

52. In the panel board art, a base, a bus-bar system secured to said base and wholly concealed from the front thereof, circuit controlling devices detachably secured to the front of said base, detachable means for securing said circuit controlling devices in position and for completing multiple electrical connections between said circuit controlling devices and said bus-bar system, said detachable means being removable from the front of said base without dis-assembling the base or the bus-bar system, and connector terminals for said bus-bar system located on the front of said base.

53. In the panel board art, a base, a bus-bar system secured to said base, said base comprising a front plate for holding circuit controlling devices detachably secured to the front of said base, a cover plate substantially equal in area to said base for securing and concealing the bus-bar system in said base, and detachable means for completing the electrical connection between said circuit controlling devices and said bus-bar system removable from the front of said base.

54. In the panel board art, a base, an individual bus-bar system loosely secured to said base and wholly concealed from the front but having connection terminals accessible from the front of said base, and a plurality of circuit controlling devices connected in multiple to said bus-bar system and detachably secured to the front of said base whereby said circuit controlling devices may be attached and detached wholly from the front of the base.

55. In the panel board art, a base consisting of two parts having a concealed bus-bar system loosely secured between the parts of the said base and provided with terminals accessible from the front of the base for connection with the line circuit, circuit controlling devices and means for connecting the circuit controlling devices to the bus-bar system wholly from the front of the base.

56. In the panel board art as an article of manufacture, a base comprising front and rear portions, an individual bus-bar system interposed between the same and concealed thereby, and having connection terminals accessible from the front of the board, and means provided in connection with said base and bus-bar system for the reception of detachable circuit controlling devices on the front face of said front portion.

57. A panel board comprising a panel of insulating material having front and rear faces, a bus-bar system supported by said panel and wholly concealed from the front thereof, main connection terminals electrically connected with said bus-bar system and supported on the front face of said panel, branch connection terminals for electrical connection with the branch circuits and also supported on said panel, fuse receptacles for controlling the circuits between said bus-bar system and the branch connection terminals supported on the front face of said panel, means for detachably securing the fuse receptacles in position on said panel and accessible wholly from the front of the panel for attaching and detaching the fuse receptacles, and means for loosely holding said bus-bar system in position with respect to said panel independently of said securing means for the fuse receptacles.

58. A panel board construction comprising a plate of insulating material having front and rear faces, and having an opening therethrough, a unitary combined bus-bar and connection terminal member of conducting material comprising an elongated bus-bar portion individual to and extending along the rear face of said plate, and means associated with said bus-bar member for connection with branch circuit controlling devices, a portion of the bus-bar member extending through said opening and together with said connection terminal portion extending along the front face of said plate.

In witness whereof, I have hereunto subscribed my name.

HENRY F. STARRETT.

---

Correction in Letters Patent No. 1,294,185.

It is hereby certified that in Letters Patent No. 1,294,185, granted February 11, 1919, upon the application of Henry F. Starrett, of Chicago, Illinois, for an improvement in "Panel-Boards and Panel-Board Construction," an error appears in the printed specification requiring correction as follows: Page 10, line 81, for the word "units" read *circuits;* and that the said Letters Patent should be read with this correction therein that the same may conform to the record of the case in the Patent Office.

Signed and sealed this 15th day of April, A. D., 1919.

[SEAL.]

F. W. H. CLAY,

*Acting Commissioner of Patents.*

Cl. 247—13.